(12) United States Patent
Kouzuma et al.

(10) Patent No.: US 10,124,673 B2
(45) Date of Patent: Nov. 13, 2018

(54) REACTION FORCE OUTPUT DEVICE

(71) Applicant: HONDA LOCK MFG. CO., LTD., Miyazaki-Shi, Miyazaki (JP)

(72) Inventors: Hiroyuki Kouzuma, Miyazaki (JP); Kohei Hirotani, Miyazaki (JP)

(73) Assignee: Honda Lock Mfg. Co., Ltd., Miyazaki (JP)

( * ) Notice: Subject to any disclaimer, the term of this patent is extended or adjusted under 35 U.S.C. 154(b) by 331 days.

(21) Appl. No.: 15/027,409

(22) PCT Filed: Sep. 16, 2014

(86) PCT No.: PCT/JP2014/074433
§ 371 (c)(1),
(2) Date: Apr. 5, 2016

(87) PCT Pub. No.: WO2015/053049
PCT Pub. Date: Apr. 16, 2015

(65) Prior Publication Data
US 2016/0250924 A1    Sep. 1, 2016

(30) Foreign Application Priority Data

Oct. 8, 2013  (JP) .................................. 2013-211136
Nov. 13, 2013 (JP) .................................. 2013-235128
Apr. 17, 2014 (JP) .................................. 2014-085443

(51) Int. Cl.
*B60K 26/04* (2006.01)
*B60K 26/02* (2006.01)
(Continued)

(52) U.S. Cl.
CPC ............ *B60K 26/021* (2013.01); *B60K 26/04* (2013.01); *F16D 41/12* (2013.01); *F16D 41/18* (2013.01);
(Continued)

(58) Field of Classification Search
CPC ..................................................... B60K 26/04
See application file for complete search history.

(56) References Cited

U.S. PATENT DOCUMENTS 5,570,752 A    11/1996  Takata
9,229,469 B2 *  1/2016  Maruyama ............... G05G 1/30
(Continued)

FOREIGN PATENT DOCUMENTS

CN         1113048 A      12/1995
CN       202560884 U      11/2012
(Continued)

OTHER PUBLICATIONS

Extended European search report issued over the corresponding European patent application 14853124.7 dated May 4, 2017.
(Continued)

*Primary Examiner* — Derek D Knight
(74) *Attorney, Agent, or Firm* — Carrier Blackman & Associates, P.C.; Joseph P. Carrier; Fulchand P. Shende

(57) ABSTRACT

A reaction force output device that outputs a reaction force to an operation unit includes: a motor as a drive source configured to create the reaction force; a reaction force transmission unit configured to transmit the reaction force to the operation unit; and a clutch mechanism disposed between the motor and the reaction force transmission unit and configured to set the motor and the reaction force transmission unit to a disengaged state or an engaged state depending on a driving state of the motor.

9 Claims, 27 Drawing Sheets

(51) Int. Cl.
*G05G 5/03* (2008.04)
*F16D 41/12* (2006.01)
*F16D 41/18* (2006.01)
*F16H 19/08* (2006.01)
*G05G 1/44* (2008.04)

(52) U.S. Cl.
CPC .............. *F16H 19/08* (2013.01); *G05G 5/03* (2013.01); *B60K 2026/023* (2013.01); *B60K 2026/043* (2013.01); *G05G 1/44* (2013.01)

(56) References Cited

U.S. PATENT DOCUMENTS

| | | |
|---|---|---|
| 2003/0236608 A1 | 12/2003 | Egami |
| 2013/0152725 A1 | 6/2013 | Maruyama et al. |
| 2014/0251069 A1* | 9/2014 | Maruyama ........... B60K 26/021 74/513 |

FOREIGN PATENT DOCUMENTS

| | | |
|---|---|---|
| CN | 103080865 A | 5/2013 |
| DE | 10 2010 062 076 A1 | 5/2012 |
| EP | 2 613 217 A1 | 7/2013 |
| JP | H07-35164 A | 2/1995 |
| JP | 2004-017935 A | 1/2004 |
| JP | 2010-003164 A | 1/2010 |
| JP | 2010-111379 A | 5/2010 |
| WO | 2012/029503 A1 | 3/2012 |
| WO | 2013/099581 A1 | 7/2013 |

OTHER PUBLICATIONS

PCT/ISA/210 from PCT/JP2014/074433 with the English translation thereof.
Office Action issued in the corresponding Chinese Patent Application No. 201480054956.8 dated Aug. 29, 2017 and English translation thereof.

\* cited by examiner

REACTION FORCE OUTPUT DEVICE

TECHNICAL FIELD

The present invention relates to a reaction force output device that outputs a reaction force to an operation pedal such as an accelerator pedal of a vehicle.

Priority is claimed on Japanese Patent Application No. 2013-211136, filed Oct. 8, 2013, Japanese Patent Application No. 2013-235128, filed Nov. 13, 2013, and Japanese Patent Application No. 2014-085443, filed Apr. 17, 2014, the contents of which are incorporated herein by reference.

BACKGROUND ART

Recently, an accelerator pedal device has been developed that applies a reaction force corresponding to a depressed state to an accelerator pedal to prevent the accelerator pedal from being depressed more than necessary when a vehicle starts moving or while the vehicle is moving (for example, see Patent Literature 1).

The accelerator pedal device described in Patent Literature 1 includes a housing that rotatably supports a base end of a pedal arm (operation pedal), and a return spring that returns the pedal arm to an initial position, a motor that creates a reaction force, and an output lever that transmits rotation of the motor to the pedal arm are incorporated in the housing. The output lever is normally biased to an initial rotational position by a bias spring separate from the return spring of the pedal arm.

In the accelerator pedal device, the motor is controlled to an output corresponding to a depressed state of the accelerator pedal by a controller and the output is applied to the pedal arm via the output lever.

CITATION LIST

Patent Literature

[Patent Literature 1]
Japanese Unexamined Patent Application, First Publication No. 2010-111379

SUMMARY OF INVENTION

Technical Problem

However, the accelerator pedal device described in Patent Literature 1 has a structure in which a shaft of a transmission lever for outputting a reaction force to the pedal arm is directly connected to a rotation shaft of the motor as a drive source. Accordingly, even when reaction force control using the motor is not performed (when power is not supplied to the motor, or when driving of the motor is stopped) as well as when reaction force control using the motor is performed (when power is supplied to the motor, or when the motor is driven), the shaft of the transmission lever and the rotation shaft of the motor are interlinked with each other and the rotation shaft of the motor rotates to follow the rotation of the transmission lever. When the rotation shaft rotates in a state in which power is not supplied to the motor (in a state in which the driving of the motor is stopped), rotational friction such as a cogging torque which is generated between a magnet and a core in the motor may act on the shaft side of the transmission lever, which may cause discomfort to a driver depressing the accelerator pedal.

An object of the present invention is to provide a reaction force output device that does not cause an operator discomfort by causing rotational friction on a motor side not to act on a reaction force output shaft side when reaction force control using a motor is not performed.

The accelerator pedal device described in Patent Literature 1 has a structure in which the shaft of the output lever for outputting a reaction force to the pedal arm is directly connected to the rotation shaft of the motor as a drive source. Accordingly, when the accelerator pedal is rapidly returned, the rotational friction of the motor serves as rotational resistance in the return direction of the output lever, which delays following of the accelerator pedal by the output lever. When the following of the accelerator pedal by the output lever is greatly delayed, a space is formed between the pedal arm and the output lever and thus there is a possibility that output of a reaction force from the motor will be delayed when the accelerator pedal is depressed again in that state.

Another object of the present invention is to provide a reaction force output device that can enhance responsiveness of reaction force output from a motor by causing rotational friction on a motor side not to hinder rotation in a return direction of an output lever when an operation pedal is rapidly returned.

Solution to Problem

A reaction force output device according to the present invention employs the following configurations to solve the above-mentioned problems.

1) According to an aspect of the present invention, there is provided a reaction force output device that outputs a reaction force to an operation unit, including: a motor as a drive source configured to create the reaction force; a reaction force transmission unit configured to transmit the reaction force to the operation unit; and a clutch mechanism disposed between the motor and the reaction force transmission unit and configured to set the motor and the reaction force transmission unit to a disengaged state or an engaged state depending on a driving state of the motor.

According to the aspect of (1), when the motor is driven for reaction force control, the clutch mechanism causes a rotation shaft of the motor to engage with a reaction force output shaft. Accordingly, the torque of the motor is output to an operation pedal via the clutch mechanism and the reaction force output shaft. When the motor is not driven, the clutch mechanism disengages the rotation shaft of the motor and the reaction force output shaft from each other. Accordingly, when the reaction force output shaft is rotationally operated in this state, the reaction force output shaft rotates without being affected by rotational friction such as a cogging torque on the motor side.

(2) In the aspect of (1), a reduction mechanism configured to reduce rotation to increase a torque in a path for transmitting a driving force from a rotation shaft of the motor to the reaction force transmission unit may be further disposed between the motor and the reaction force transmission unit.

According to the aspect of (2), since the torque of the motor can be increased by the reduction mechanism and a force can be applied as a reaction force to the operation pedal, it is possible to use a small general-purpose motor. Accordingly, it is possible to achieve a decrease in size and weight of the reaction force output device as a whole.

(3) In the aspect of (2), the reduction mechanism may include a plurality of stages of reduction gears configured to reduce rotation in a stepwise manner in the path, and the clutch mechanism may be disposed closer to the motor than the final-stage reduction gear closest to the reaction force transmission unit in the path.

According to the aspect of (3), since the clutch mechanism is disposed upstream (on the motor side) in the path from the final-stage reduction gear, an engaging and disengaging operation of the clutch mechanism is performed at a relatively high rotation speed before the rotation speed is finally reduced. Accordingly, even a simple clutch mechanism requiring relatively large displacement for engagement and disengagement can perform transmission and interception of power for a short time.

(4) In any one aspect of (1) to (3), the clutch mechanism may include: a first rotary member connected to a rotation shaft side of the motor in the path; a second rotary member disposed coaxially with the first rotary member to relatively rotate and connected to the reaction force transmission unit side in the path; and a holder block disposed coaxially with the first rotary member and the second rotary member to relatively rotate between the first rotary member and the second rotary member and configured to hold a clutch pin to move forward and backward, the second rotary member may include a clutch engagement portion configured to come in contact with a tip of the clutch pin protruding from the holder block to transmit power, the clutch pin may be biased in a backward moving direction by a return spring, and a base end of the clutch pin may come in contact with the first rotary member to be pressed in a protruding direction when the first rotary member is rotated by the motor.

According to the aspect of (4), when the motor is not driven, the clutch pin on the holder block moves backward with a biasing force of the return spring and the tip of the clutch pin is separated from the clutch engagement portion of the second rotary member. At this time, the first rotary member and the second rotary member are held in a disengaged state. When the motor is driven in this state and the first rotary member rotates, the first rotary member comes in contact with the base end of the clutch pin on the holder block and causes the clutch pin to protrude from the holder block against the biasing force of the return spring. Accordingly, the tip of the clutch pin comes in contact with the clutch engagement portion of the second rotary member and transmits the rotation of the first rotary member to the second rotary member via the clutch pin.

(5) In the aspect of (4), a plurality of the clutch engagement portions of the second rotary member may be disposed at equal intervals in a circumferential direction centered on a rotation axis of the second rotary member, a plurality of the clutch pins of the holder block may be held by the holder block, and a rotational phase of the first rotary member and the second rotary member when one clutch pin on the holder block comes in contact with the clutch engagement portion on the second rotary member side and the rotational phase of the first rotary member and the second rotary member when another clutch pin on the holder block comes in contact with the clutch engagement portion on the second rotary member side may be set to be offset from each other.

According to the aspect of (5), when the motor is driven, one of one clutch pin and another clutch pin on the holder block comes in contact with the clutch engagement portion on the second rotary member side earlier. Accordingly, it is possible to realize rapid clutch engagement without increasing the number of clutch engagement portions disposed on the second rotary member side.

(6) In the aspect of (5), the rotational phase of the first rotary member and the second rotary member when one clutch pin on the holder block comes in contact with the clutch engagement portion on the second rotary member side and the rotational phase of the first rotary member and the second rotary member when another clutch pin on the holder block comes in contact with the clutch engagement portion on the second rotary member side may be set to be offset from each other by half a pitch angle of the neighboring clutch engagement portions on the second rotary member side.

According to the aspect of (6), when one clutch pin and another clutch pin on the holder block are pressed to protrude by the first rotary member with the driving of the motor, any one of one clutch pin and another clutch pin comes in contact with the clutch engagement portion while the first rotary member and the second rotary member relatively rotate by at least half the pitch angle of the clutch engagement portions. As a result, it is possible to realize rapider clutch engagement.

(7) The reaction force output device according to the aspect of (1) may further include a planetary gear mechanism disposed between the motor and the reaction force transmission unit, the planetary gear mechanism may include a sun gear to which a torque from the motor side is input, a ring gear disposed coaxially with the sun gear, a planetary gear configured to engage with the sun gear and the ring gear, and a carrier configured to support the planetary gear to rotate and revolve and to output the reaction force to the reaction force transmission unit side, the clutch mechanism may include a protrusion configured to protrude from the ring gear, and a stopper configured to come in contact with the protrusion, the protrusion may come in contact with the stopper to regulate rotation of the ring gear at the time of rotation of the motor, and the protrusion may be separated from the stopper to allow rotation of the ring gear at the time of stopping of the rotation of the motor.

According to the aspect of (7), when the operation unit is operated and the motor is driven for the reaction force control, a first rotary element rotates with a driving force of the motor and rotation of a third rotary element is regulated by bringing the protrusion and the stopper of the clutch mechanism into contact with each other. Then, a second rotary element rotates together with the rotation of the first rotary element and thus the reaction force is output to the reaction force transmission unit. Accordingly, the reaction force is transmitted to the operation unit via the reaction force transmission unit.

On the other hand, when the driving of the motor is stopped, the protrusion and the stopper are separated from each other and thus rotation of the third rotary element is allowed. Accordingly, when the reaction force transmission unit is activated by the operation of the operation unit or the like in this state, the third rotary element rotates together with the rotation of the second rotary element. That is, when the rotation of the third rotary element is allowed, the torque required for the rotation of the third rotary element is smaller than the torque required for the rotation of the motor and thus the rotation of the first rotary element is suppressed and the third rotary element rotates earlier. Accordingly, when the reaction force control using a motor is not performed, the reaction force transmission unit is operated without being affected by the rotational friction of the motor side. As a result, it is possible to improve an operational feeling when the reaction force control using a motor is not performed.

(8) In the aspect of (7), a plurality of the planetary gear mechanisms may be provided, and the clutch mechanism may switch transmission and interception of the reaction force to the reaction force transmission unit side between the planetary gear mechanism located closest to the reaction force transmission unit among the plurality of planetary gear mechanisms and the reaction force transmission unit.

According to the aspect of (8), since a plurality of planetary gear mechanisms are provided, it is possible to achieve a decrease in size and cost of the motor and to output a large torque to the reaction force transmission unit.

The clutch mechanism switches transmission and interception of a reaction force to the reaction force transmission unit between the planetary gear mechanism located closest to the reaction force transmission unit and the reaction force transmission unit. Accordingly, when the rotation of the motor is stopped and the reaction force transmission unit is operated by the operation of the operation unit or the like, it is possible to operate the reaction force transmission unit without it being affected by the rotational friction of the planetary gear mechanisms.

(9) The reaction force output device according to the aspect of (1) may further include a bias spring configured to bias the reaction force transmission unit in a direction following a return operation of the operation unit, the clutch mechanism may include a first rotary member connected to a rotation shaft side of the motor in a path in which a driving force is transmitted from the motor to the reaction force transmission unit, a second rotary member disposed coaxially with the first rotary member to relatively rotate and connected to the reaction force transmission unit side in the path, a holder block configured to rotate in the same direction as the first rotary member with a rotational force received from the first rotary member when the first rotary member is rotated by the motor, a clutch claw held to rotate by the holder block, a clutch engagement portion disposed in the second rotary member to engage with the clutch claw, and a clutch spring configured to bias the clutch claw to a rotational position at which the clutch claw engages with the clutch engagement portion, the clutch claw may rotate between a clutch engaged position at which the clutch claw engages with the clutch engagement portion to transmit rotation of the holder block to the second rotary member and a clutch disengaged position at which the clutch claw is disengaged from the clutch engagement portion, and the clutch claw may be pressed in a clutch disengaging direction by the clutch engagement portion when the second rotary member rotates in a biasing direction of the bias spring prior to the holder block.

According to the aspect of (9), in the initial state, the clutch claw on the holder block is located at the clutch engaged position by the biasing force of the clutch spring. When the operation pedal is depressed in this state and the motor is driven for the reaction force control, the first rotary member rotates in a reaction force output direction along with the holder block. When the holder block rotates in the reaction force output direction in this way, the clutch claw on the holder block engages with the clutch engagement portion and the rotation of the first rotary member is transmitted to the second rotary member. As a result, the torque of the motor is output to the operation pedal sequentially via the clutch mechanism, a reaction force output shaft, and an output lever.

When the operation pedal is rapidly returned from the depressed state, the output lever is prone to rotate to follow the return operation of the operation pedal due to the biasing force of the bias spring. Accordingly, the second rotary member rotates in the return direction via the reaction force output shaft. At this time, in the clutch mechanism, since the second rotary member is prone to rotate in the biasing direction of the bias spring prior to the holder block, the clutch claw is pressed in the clutch disengaging direction by the clutch engagement portion.

Accordingly, the clutch mechanism is switched to the disengaged state and the output lever rapidly follows the return operation of the operation pedal.

(10) In the aspect of (9), a plurality of the clutch engagement portions of the second rotary member may be disposed at equal intervals in a circumferential direction centered on a rotation axis of the second rotary member, a plurality of the clutch claws may be disposed on a rotational circumference of the first rotary member, and a rotational phase of the first rotary member and the second rotary member when one clutch claw comes in contact with the clutch engagement portion on the second rotary member side and the rotational phase of the first rotary member and the second rotary member when another clutch claw comes in contact with the clutch engagement portion on the second rotary member side may be set to be offset from each other.

According to the aspect of (10), when the motor is driven, any one of one clutch claw and another clutch claw on the holder block comes in contact with the clutch engagement portion on the second rotary member earlier. Accordingly, it is possible to realize rapid clutch engagement.

Advantageous Effects of Invention

According to the aspects of the present invention, the clutch mechanism setting the rotation shaft of the motor and the reaction force output shaft to the engaged state when the motor is driven and setting the rotation shaft of the motor and the reaction force output shaft to the disengaged state when the motor is not driven is disposed between the rotation shaft of the motor and the reaction force output shaft. Accordingly, when the reaction force control using a motor is not performed, it is possible to prevent the rotational friction on the motor side from acting on the reaction force output shaft side. As a result, it is possible to improve an operational feeling when the reaction force control using a motor is not performed.

According to the aspects of the present invention, when the second rotary member rotates in the biasing direction of the bias spring prior to the holder block, the clutch claw held by the holder block is pressed in the clutch disengaging direction by the clutch engagement portion. Accordingly, when the operation pedal is rapidly returned, the clutch mechanism between the first rotary member and the second rotary member is switched to the disengaged state and the rotational friction of the motor side does not interfere with the rotation of the output lever in the return direction. According to the aspects of the present invention, when the operation pedal is rapidly returned, the output lever rapidly follows the return operation of the operation pedal. Accordingly, when the operation pedal is depressed again thereafter, it is possible to rapidly achieve a reaction force output of the motor.

DESCRIPTION OF EMBODIMENTS

First Embodiment

Hereinafter, a first embodiment of the present invention will be described with reference to the accompanying drawings.

Figure 1:
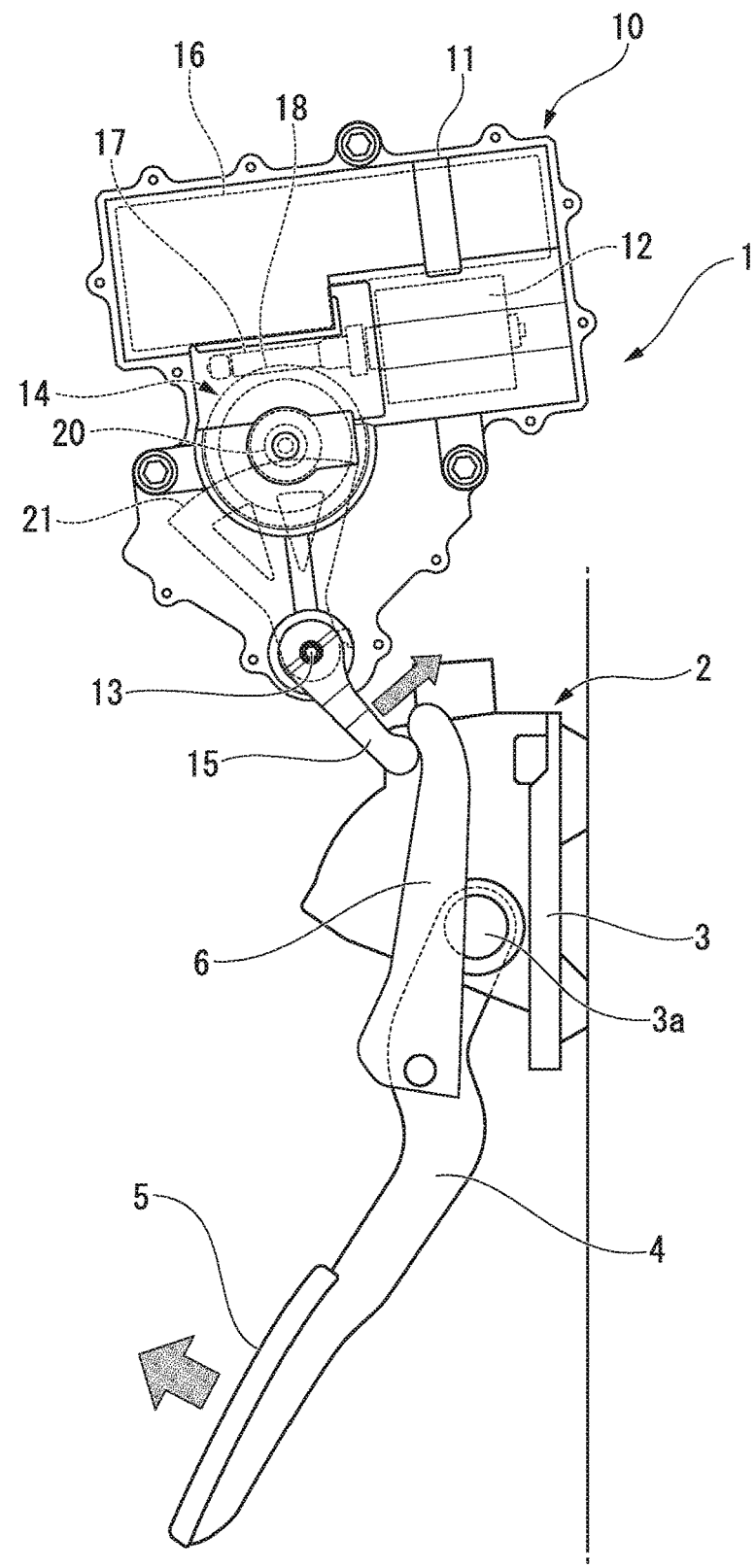
FIG. 1 is a side view of an accelerator pedal device using a reaction force output device according to a first embodiment of the present invention.

FIG. 1 is a diagram illustrating an accelerator pedal device 1 of a vehicle employing a reaction force output device 10 according to the first embodiment.

The accelerator pedal device 1 includes a pedal body unit 2 that is disposed in front of a foot of a driver seat and a reaction force output device 10 that is disposed above the pedal body unit 2 on in front of the foot of the driver seat.

The pedal body unit 2 includes a support base 3 that is attached to a vehicle body, a pedal arm (operation pedal, operation unit) 4 of which a base end is rotatably supported by a spindle 3a disposed in the support base 3, and a pedal body 5 (operation pedal, operation unit) that is disposed on the front surface on a tip side of the pedal arm 4 and to which a depressing force is applied by a driver, and the support base 3 is provided with a return spring (not illustrated) that normally biases the pedal arm 4 to an initial position. The pedal arm 4 is connected to a cable (not illustrated) that adjusts a degree of opening of a throttle valve (not illustrated) of an internal combustion engine depending on a degree of operation (rotational angle) of the pedal arm 4. When the internal combustion engine employs an electronically controlled throttle, the pedal body unit 2 may be provided with a rotation sensor that detects the rotational angle of the pedal arm 4 and the degree of opening of the throttle valve may be controlled based on a detection signal of the rotation sensor. A reaction force transmission lever 6 (reaction force transmission unit) that extends in a direction substantially opposite to the extending direction of the pedal arm 4 is integrally connected to the vicinity of the base end of the pedal arm 4.

In the first embodiment, the pedal arm 4 and the pedal body 5 constitute an operation pedal.

Figure 2:
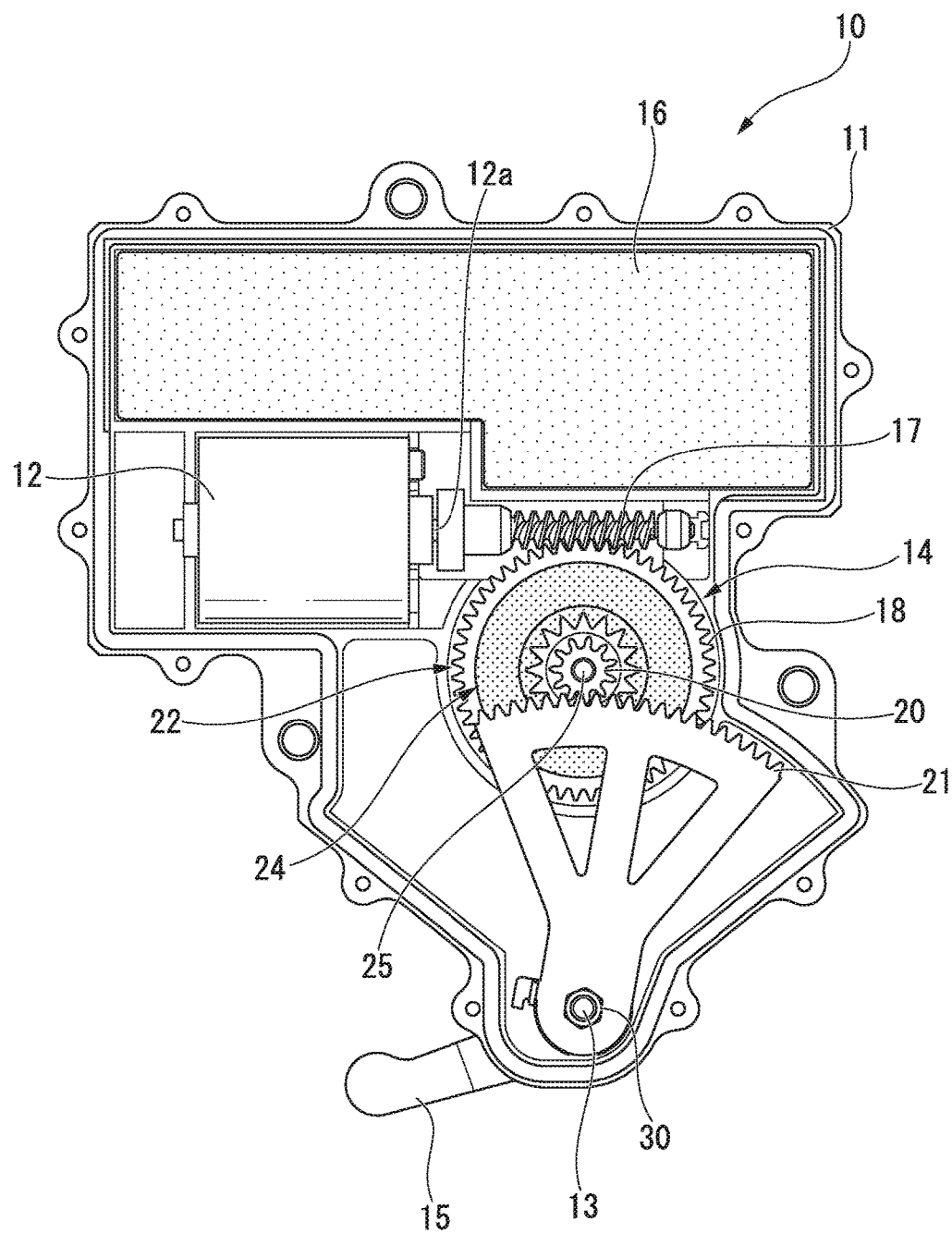
FIG. 2 is a front view illustrating a state in which a housing cover of the reaction force output device according to the first embodiment of the present invention is removed.

FIG. 2 is a diagram illustrating an internal structure of the reaction force output device 10. FIG. 2 illustrates a state in which a housing cover of a housing 11 formed of a resin is removed.

The reaction force output device 10 includes a motor 12 as a drive source that creates a reaction force, a reaction force output shaft 13 (reaction force transmission unit) that is rotationally supported by the housing 11, and a reduction mechanism 14 that reduces rotation of the motor 12 to increase a torque and transmits the increased torque to the reaction force output shaft 13. One end in the axial direction of the reaction force output shaft 13 protrudes outward from a side surface of the housing 11 and an output lever 15 (reaction force transmission unit) is integrally connected to the protruding end. As illustrated in FIG. 1, a tip of the output lever 15 can come in contact with the reaction force transmission lever 6 of the pedal body unit 2 in a rotating direction. The output lever 15 and the reaction force transmission lever 6 come in contact with each other when the pedal body 5 is depressed by a driver. Reference numeral 16 in FIG. 2 denotes a circuit board on which a control circuit for driving the motor 12 is mounted.

Figure 3:
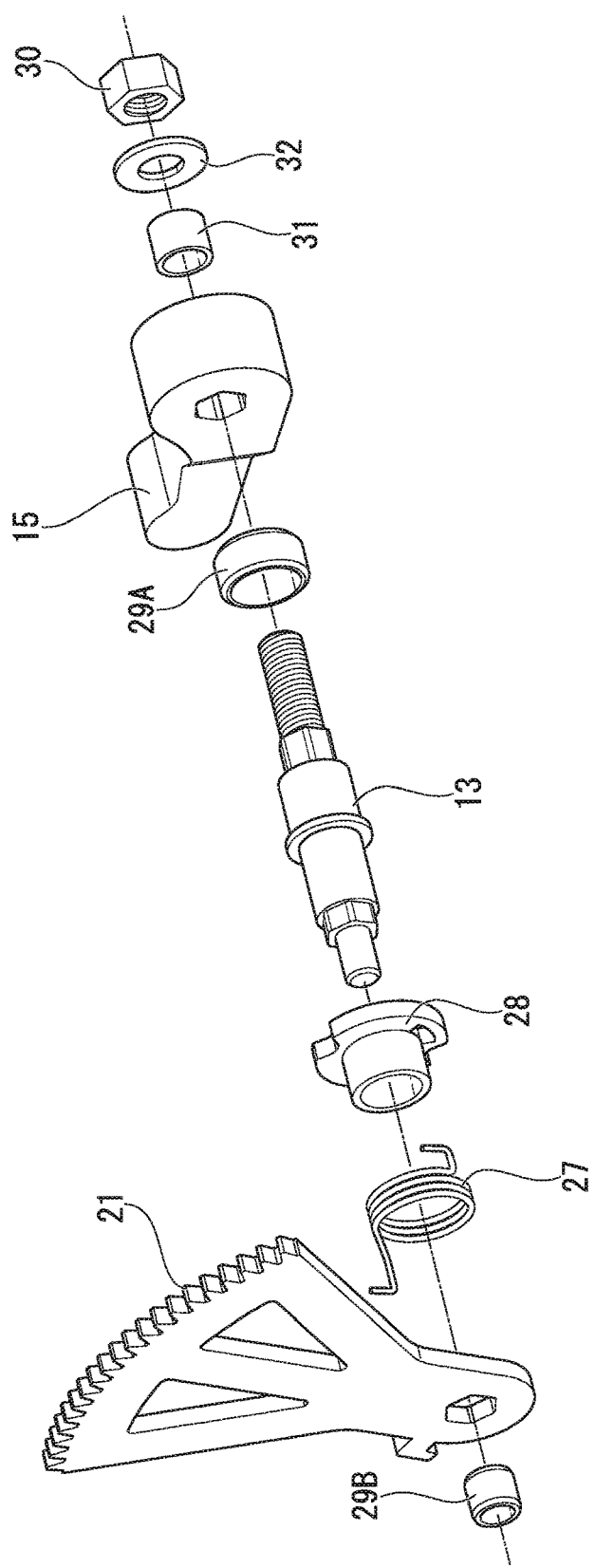
FIG. 3 is an exploded perspective view illustrating a part of the reaction force output device according to the first embodiment of the present invention.
Figure 4:
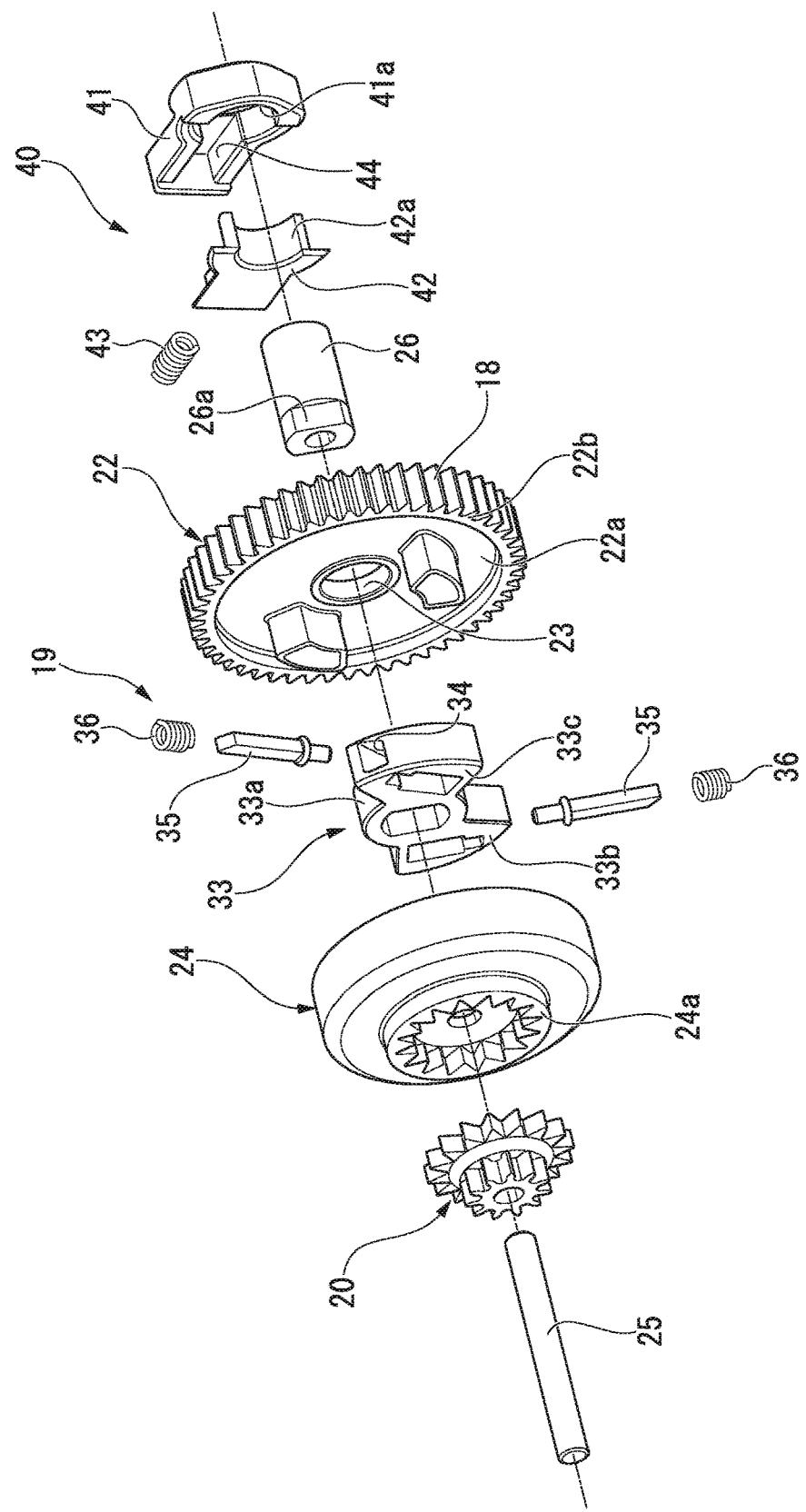
FIG. 4 is an exploded perspective view illustrating a part of the reaction force output device according to the first embodiment of the present invention.

FIGS. 3 and 4 are exploded perspective views illustrating principal parts including components of the reduction mechanism 14.

As illustrated in FIG. 2, the reduction mechanism 14 includes a worm shaft 17 that is coaxially coupled to a rotation shaft 12a of the motor 12, a worm wheel 18 that engages with the worm shaft 17, a pinion gear 20 that is integrally rotatably connected to the worm wheel 18 via a clutch mechanism 19 (see FIG. 4), and a sector gear 21 (reaction force transmission unit) that engages with the pinion gear 20 and the sector gear 21 is integrally coupled to the reaction force output shaft 13. As will be described in detail later, the clutch mechanism 19 connects the worm wheel 18 to the pinion gear 20 only when the motor 12 is driven.

In the reduction mechanism 14 according to the first embodiment, a first-stage reduction gear is constituted between the worm shaft 17 and the worm wheel 18, and a second-stage reduction gear (final-stage reduction gear) is constituted between the pinion gear 20 and the sector gear 21.

As illustrated in FIG. 4, the worm wheel 18 is formed in a cylindrical wall portion 22b of a first rotary member 22 having a bottomed cylindrical shape and having a shaft hole 23 in a bottom wall portion 22a. The pinion gear 20 is attached to a second rotary member 24 having a bottomed cylindrical shape and relatively rotatably inserted into the cylindrical wall portion 22b of the first rotary member 22. In the first embodiment, the base portion of the pinion gear 20 is coaxially embedded in and fixed to the outer surface of a bottom wall portion 24a of the second rotary member 24. The pinion gear 20 and the second rotary member 24 are supported by the housing 11 via a support pin 25 penetrating and supporting them. A support shaft 26 coaxially fitted to the support pin 25 is rotatably inserted into the shaft hole 23 of the bottom wall portion 22a of the first rotary member 22.

As illustrated in FIG. 3, the sector gear 21 is integrally attached to the other end in the axial direction of the reaction force output shaft 13, and one end of a coil spring 27 rotationally biasing the sector gear 21 and the reaction force output shaft 13 to the initial position is locked to the sector gear 21. The other end of the coil spring 27 is locked to a substantially tubular spring holder 28 locked to the housing 11. Reference signs 29A and 29B in FIG. 3 denote bearings for rotatably supporting the reaction force output shaft 13 on the housing 11 and reference numeral 30 denotes a nut for fastening and fixing the output lever 15 to the reaction force output shaft 13, and reference numerals 31 and 32 denote a collar and a washer interposed between the output lever 15 and the nut 30.

Figure 5:
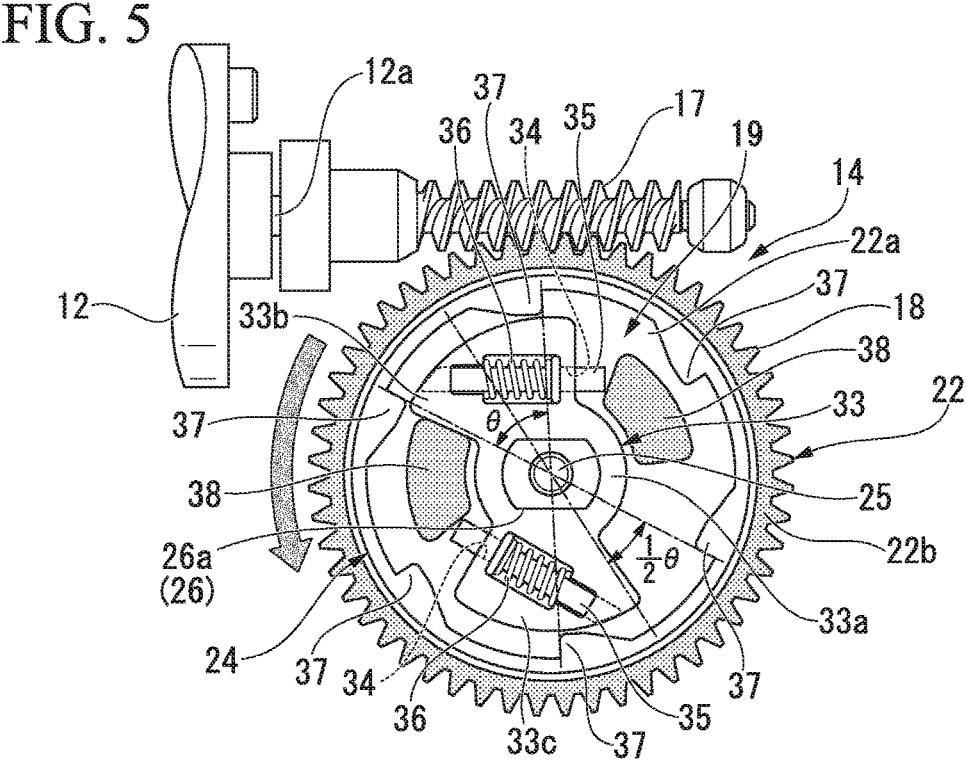
FIG. 5 is an exploded front view illustrating some components of the reaction force output device according to the first embodiment of the present invention.
Figure 6:
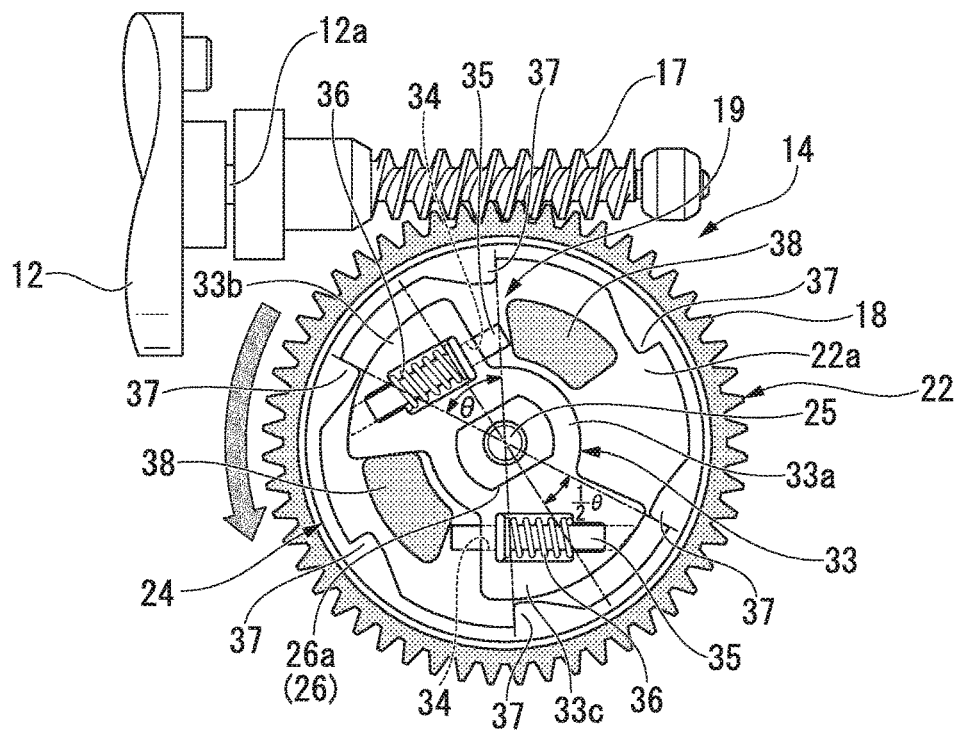
FIG. 6 is an exploded front view illustrating some components of the reaction force output device according to the first embodiment of the present invention.

FIGS. 5 and 6 are diagrams illustrating an internal structure of the reaction force output device 10 in which the bottom wall portion 24a of the second rotary member 24 is exploded.

As illustrated in FIGS. 4 to 6, the clutch mechanism 19 includes a first rotary member 22 that is connected to the rotation shaft 12a of the motor 12 via the worm shaft 17 (see FIG. 2) and the worm wheel 18, a second rotary member 24 connected to the reaction force output shaft 13 (see FIG. 2) via the pinion gear 20 and the sector gear 21, and a holder block 33 that is rotatably disposed between the first rotary member 22 and the second rotary member 24. The holder block 33 includes a shaft portion 33a that is fitted and fixed to a two-faced width portion 26a at one end of the support shaft 26 and a pair of arms 33b and 33c that protrude outward in the radial direction from the shaft portion 33a. A support hole 34 that extends in a direction intersecting the radial direction of the holder block 33 is formed in each arm 33b or 33c and the clutch pin 35 is supported in each support hole 34 to move forward and backward. The holder block 33 is disposed inside a cylindrical wall portion of the second rotary member 24 which is relatively rotatably inserted into the first rotary member 22.

Here, when a direction (a direction indicated by arrows in FIGS. 5 and 6) in which the first rotary member 22 rotates at the time of driving the motor 12 is defined as a positive rotating direction, the clutch pin 35 protrudes forward in the positive rotating direction from the support hole 34 and is normally biased backward by a return spring 36. In a state in which the clutch pin 35 is biased to move furthest backward by the return spring 36, the rear end thereof protrudes a set distance in the reverse direction of the positive rotating direction from the arms 33b and 33c.

On the other hand, six clutch engagement portions 37 having substantially triangular shapes with which the tip of the clutch pin 35 can come in contact protrude from the inner circumferential surface of the cylindrical wall portion of the second rotary member 24 surrounding the outer circumference of the holder block 33. The six clutch engagement portions 37 protrude from the inner circumferential surface of the cylindrical wall portion at equal intervals in the circumferential direction. In each clutch engagement portion 37, a surface opposite to the positive rotating direction rises substantially upright to the center of the cylindrical wall portion and an inclined surface which is inclined forward in the positive rotating direction extends from the top of the rising surface. The tip of the clutch pin 35 can come in contact with the rising surface of each clutch engagement portion 37. The protruding height of each clutch engagement portion 37 is set to a height at which the arms 33b and 33c of the holder block 33 do not come in contact therewith when the holder block 33 relatively rotates inside the second rotary member 24.

In the first embodiment, the arms 33b and 33c supporting the clutch pins 35 and the support holes 34 formed therein are not formed to be rotationally symmetric with respect to the support shaft 26. The arms 33b and 33c and the support holes 34 are formed to satisfy the following condition (a).

(a) A rotational phase of the first rotary member 22 and the second rotary member 24 when the tip of one clutch pin 35 comes in contact with the rising surface of one clutch engagement portion 37 and a rotational phase of the first rotary member 22 and the second rotary member 24 when the tip of the other clutch pin 35 comes in contact with another clutch engagement portion 37 located at a diagonal position of the one clutch engagement portion 37 are offset from each other by half a pitch angle θ of the neighboring clutch engagement portions 37 on the second rotary member 24.

A pair of pressing blocks 38 having a rectangular parallelepiped shape protrude from the front surface of the bottom wall portion 22a of the first rotary member 22. The pressing blocks 38 are disposed on a rotary orbit facing the protrusions at the rear ends of the clutch pins 35 of the holder block 33.

Figure 7:
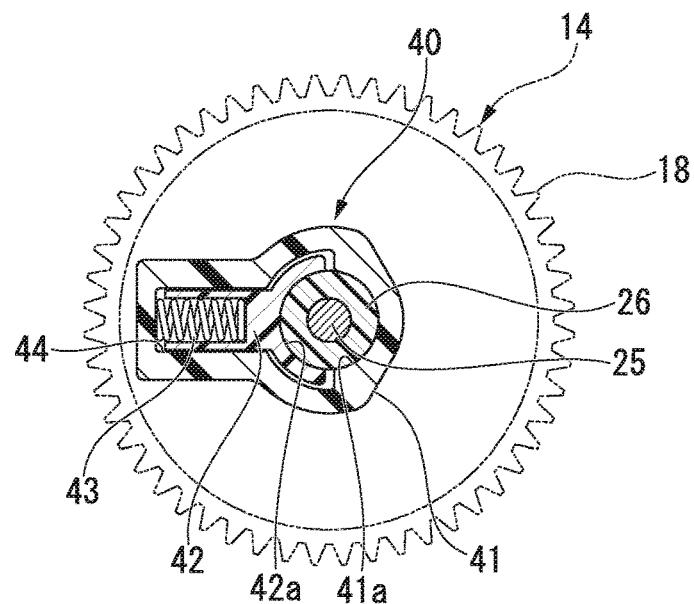
FIG. 7 is a cross-sectional view of a resistance applying mechanism portion of the reaction force output device according to the first embodiment of the present invention.

The support shaft 26 connected integrally to the holder block 33 is subjected to application of rotational resistance from a resistance applying mechanism portion 40 illustrated in FIGS. 4 and 7. The resistance applying mechanism portion 40 includes a first holder 41 having an arc surface 41a coming in slidable contact with substantially a half area of the outer circumferential surface of the support shaft 26, a second holder 42 having an arc surface 42a coming in slidable contact with substantially the other half area of the outer circumferential surface of the support shaft 26, and a bias spring 43 biasing the arc surfaces 41a and 42a of the first holder 41 and the second holder 42 toward the outer circumferential surface of the support shaft 26. The first holder 41 is provided with a housing groove 44 into which a part of the second holder 42 is slidably inserted and the bias spring 43 is interposed between the bottom of the housing groove 44 and the second holder 42. The first holder 41 is immovably locked to the housing 11.

The resistance applying mechanism portion 40 applies rotational resistance to the support shaft 26 by pressing the arc surfaces 41a and 42a of the first holder 41 and the second holder 42 to the outer circumferential surface of the support shaft 26 with the force of the bias spring 43. Accordingly, when a pressing force in the rotating direction is applied to the rear end of the clutch pin 35 held by the holder block 33 from the pressing block 38 of the first rotary member 22, the support shaft 26 having rotational resistance applied thereto from the resistance applying mechanism portion 40 and the holder block 33 are prone to stay at the current position and the clutch pins 35 protrude forward in the positive rotating direction against the biasing force of the return spring 36. As a result, one clutch pin 35 comes in contact with the clutch engagement portions 37 of the second rotary member 24 in the positive rotating direction.

FIGS. 8 to 11 are diagrams illustrating the operation of the reaction force output device 10. The operation of the reaction force output device 10 will be described below with reference to the drawings.

When the pedal body 5 illustrated in FIG. 1 is depressed by a driver, the pedal arm 4 rotates about the spindle 3a in a counterclockwise direction in the drawing and the degree of opening of the throttle valve of the internal combustion engine is adjusted depending on the rotational angle thereof. On the other hand, when the pedal arm 4 rotates counterclockwise from an initial position, the reaction force transmission lever 6 fixed to the pedal arm 4 rotates counterclockwise along with the pedal arm 4 and the output lever 15 of the reaction force output device 10 in contact with the tip of the reaction force transmission lever 6 rotates clockwise in FIG. 1 along with the reaction force output shaft 13.

At this time, when the motor 12 of the reaction force output device 10 is driven depending on a depression speed of the pedal body 5 or a driving condition of a vehicle, a driving force of the motor 12 causes the first rotary member 22 to rotate in the positive rotating direction (the direction indicated by the arrows in FIGS. 5 and 6) via the engaged portion of the worm shaft 17 and the worm wheel 18.

Figure 8:
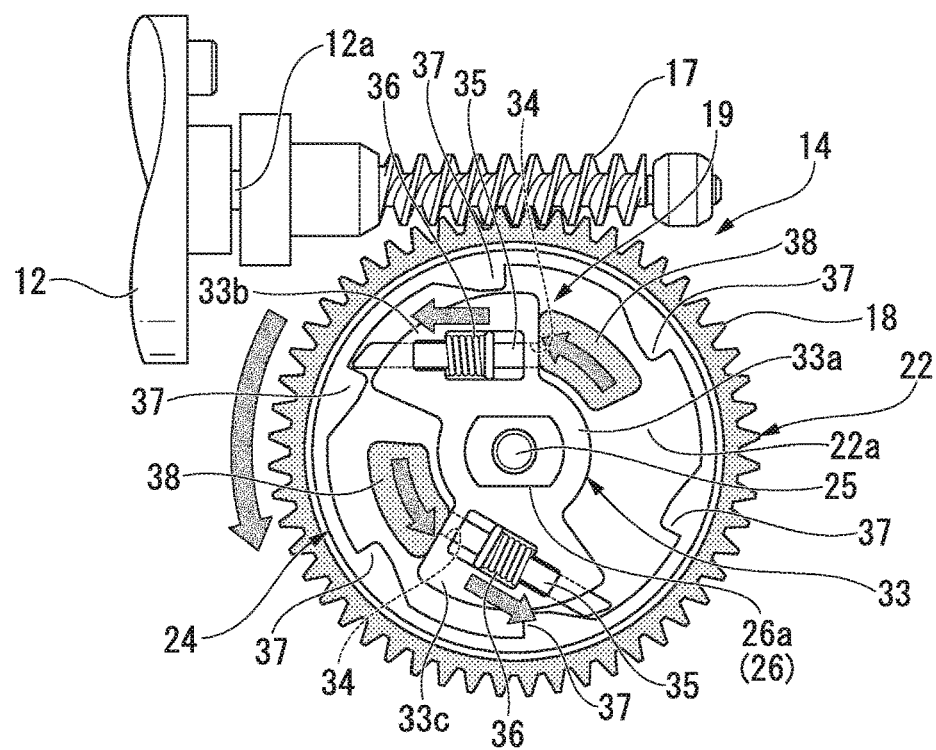
FIG. 8 is an exploded front view illustrating some components of the reaction force output device according to the first embodiment of the present invention.
Figure 9:
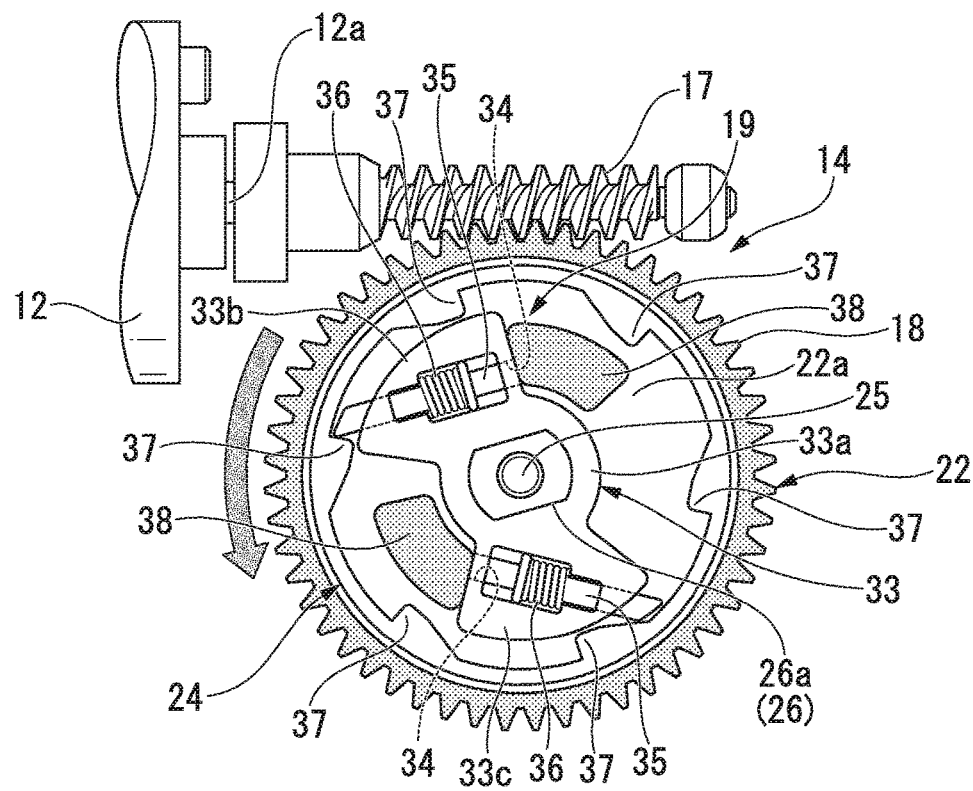
FIG. 9 is an exploded front view illustrating some components of the reaction force output device according to the first embodiment of the present invention.

When the first rotary member 22 rotates in the positive rotating direction in this way, the pressing blocks 38 of the first rotary member 22 come in contact with the rear ends of the clutch pins 35 on the holder block 33 as illustrated in FIGS. 5 and 6 to cause the first rotary member 22 to further rotate in the positive rotating direction and thus the clutch pins 35 are caused to protrude forward in the positive rotating direction against the biasing force of the return spring 36 as illustrated in FIG. 8. At this time, the tip of any one clutch pin 35 on the holder block 33 comes in contact with any clutch engagement portion 37 on the second rotary member 24 side and the second rotary member 24 rotates together with the first rotary member 22 as illustrated in FIG. 9. At this time, the clutch mechanism 19 is in an engaged state.

Figure 10:
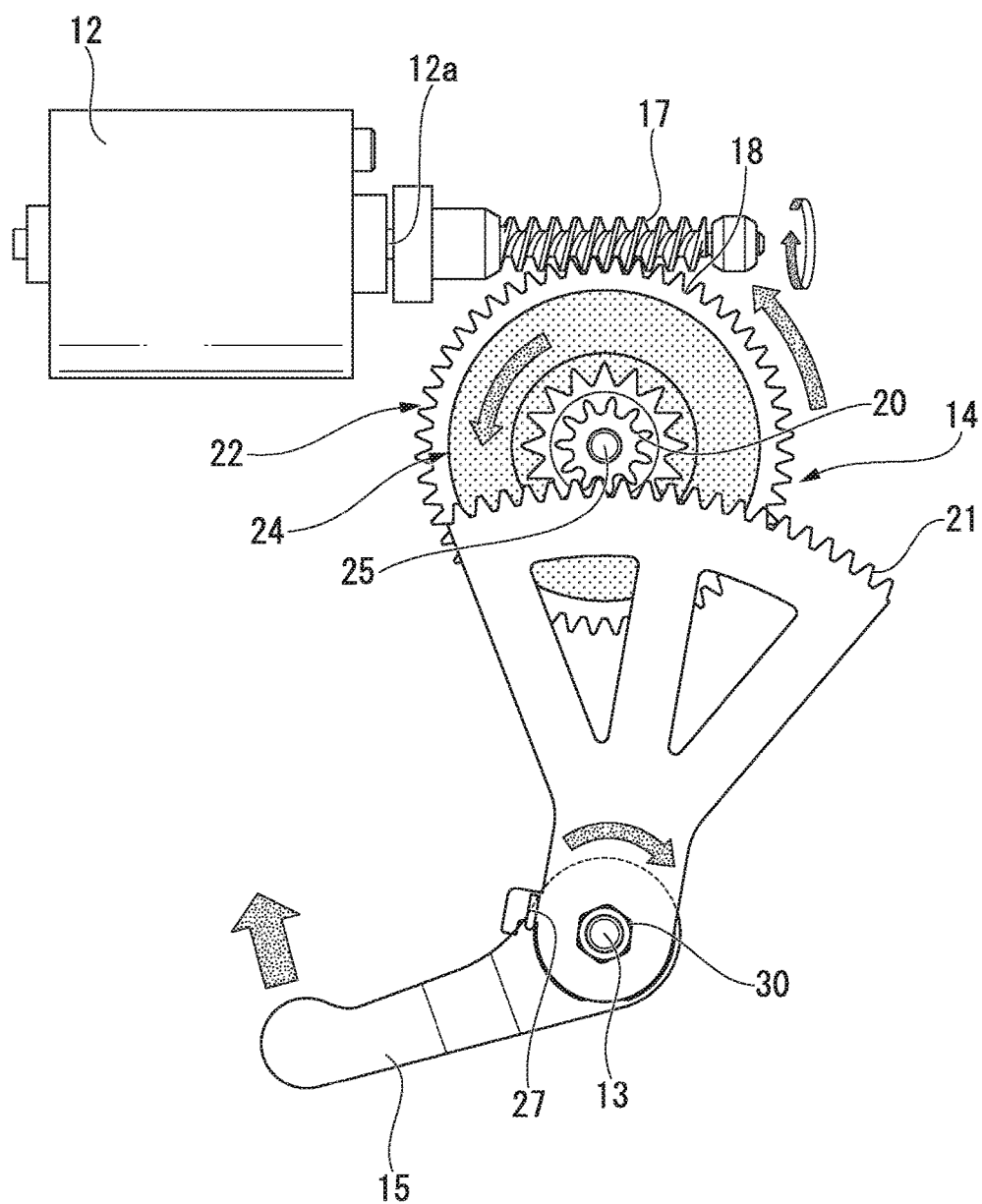
FIG. 10 is a front view illustrating a part of the reaction force output device according to the first embodiment of the present invention.

When the clutch mechanism 19 is switched to the engaged state in this way, as illustrated in FIG. 10, the pinion gear 20 of the second rotary member 24 rotates in the positive rotating direction and the sector gear 21 engaging with the pinion gear 20 rotates clockwise in the drawing. As a result, the reaction force output shaft 13 and the output lever 15 integrally coupled to the sector gear 21 rotate clockwise in the drawing against the biasing force of the coil spring 27 as indicated by an arrow in FIG. 10, and the output lever 15 transmits a reaction force to the pedal arm 4 via the reaction force transmission lever 6 of the pedal body unit 2 as indicated by an arrow in FIG. 1. At this time, since a torque corresponding to the depression speed of the pedal body 5 or the driving condition of the vehicle is output from the motor 12 to the pedal arm 4, the driver is informed of information such as an acceleration state of the internal combustion engine or "excessive depression" through the sole of her or his foot depressing the pedal body 5.

Figure 11:
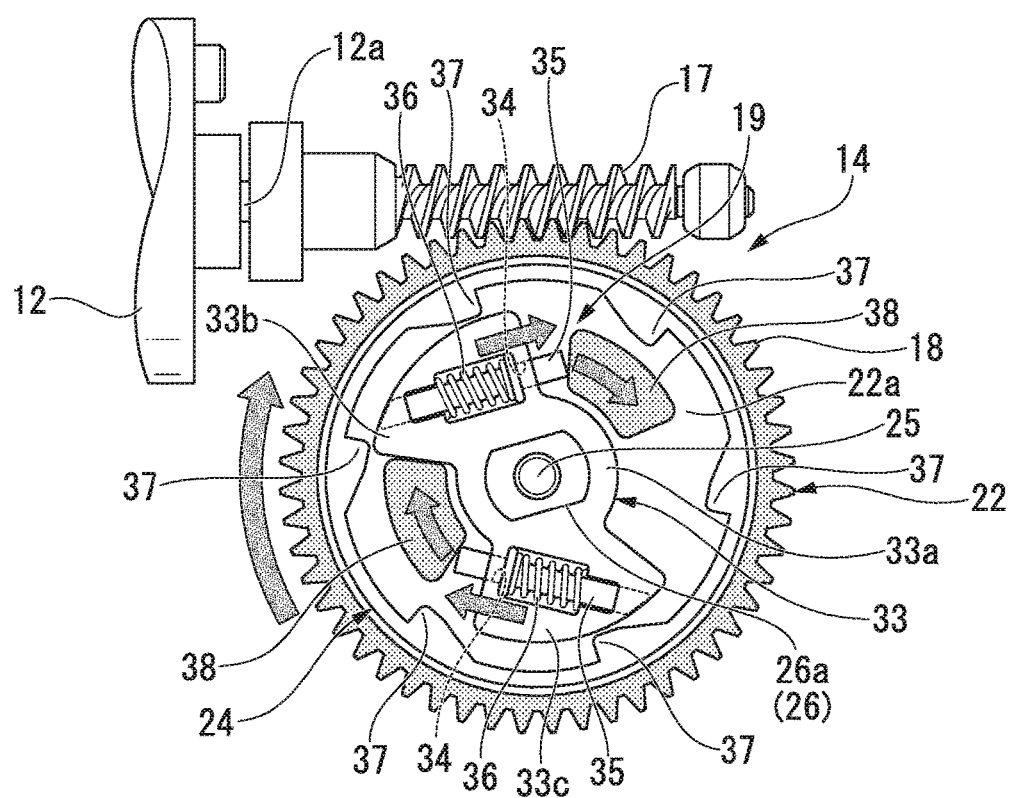
FIG. 11 is an exploded front view illustrating some components of the reaction force output device according to the first embodiment of the present invention.

When the motor 12 is deactivated in this state by the driver releasing a depressing force on the pedal body 5 or the like, as illustrated in FIG. 11, the pressing blocks 38 of the first rotary member 22 in the clutch mechanism 19 of the reaction force output device 10 are pressed back in the reverse direction to the positive rotating direction as indicated by an arrow in the drawing by the biasing force of the return spring 36 acting on the clutch pins 35 of the holder block 33. As a result, the clutch pins 35 retreat into the holder block 33 and the engagement of the clutch pins 35 and the clutch engagement portions 37 of the second rotary member 24 is released. Accordingly, the clutch mechanism 19 disengages the first rotary member 22 and the second rotary member 24 from each other and thus the rotation shaft 12a of the motor 12 is separated from the reaction force output shaft 13 side.

Accordingly, for example, when the pedal body 5 of the pedal body unit 2 is depressed by the driver in this state, the output lever 15 and the reaction force output shaft 13 of the reaction force output device 10 rotate via the reaction force transmission lever 6, but the rotation shaft 12a of the motor 12 does not follow the rotation at this time. As a result, rotational friction such as a cogging torque of the motor 12 does not affect the rotational operation of the pedal arm 4.

When the pedal arm 4 is returned to the initial position in a state in which the clutch mechanism 19 is disengaged, the reaction force output shaft 13 and the output lever 15 rotate toward the initial position with the biasing force of the coil spring 27, but since the reaction force output shaft 13 is separated from the rotation shaft 12a side of the motor 12 at this time, the reaction force output shaft 13 and the output lever 15 are rapidly returned to the initial position without being affected by the rotational friction of the motor 12.

As described above, in the reaction force output device 10 according to the first embodiment, the clutch mechanism 19 causing the rotation shaft 12a of the motor 12 and the reaction force output shaft 13 to engage with each other when the motor 12 is driven and disengaging the rotation shaft 12a of the motor 12 and the reaction force output shaft 13 from each other when the motor 12 is not driven interposed between the rotation shaft 12a of the motor 12 and the reaction force output shaft 13. Accordingly, when reaction force control using the motor 12 is not performed, it is possible to regulate acting of the rotational friction of the motor 12 on the reaction force output shaft 13.

Accordingly, by employing the reaction force output device 10 according to the first embodiment, it is possible to improve a pedal operating feeling when the reaction force control using the motor 12 is not performed.

In the reaction force output device 10 according to the first embodiment, the reduction mechanism 14 increasing the torque of the motor 12 is disposed between the rotation shaft 12a of the motor 12 and the reaction force output shaft 13. Accordingly, even when the motor 12 is a small general-purpose motor providing a small torque, it is possible to apply a satisfactory reaction force to the pedal arm 4 of the pedal body unit 2. As a result, since the reaction force output device 10 enables a small general-purpose motor to be used, it is possible to achieve a decrease in size and weight of the reaction force output device 10.

Particularly, in the reaction force output device 10 according to the first embodiment, the clutch mechanism 19 is disposed closer to the motor 12 than the final-stage reduction gear (the engaged portion of the pinion gear 20 and the sector gear 21) of the reduction mechanism 14 in the path between the rotation shaft 12a of the motor 12 and the reaction force output shaft 13. Accordingly, it is possible to perform the engagement and disengagement of the clutch mechanism 19 at a relatively high rotational speed before the output of the motor 12 is finally reduced.

Here, when the clutch mechanism is disposed closer to the reaction force output shaft 13 than the final-stage reduction gear of the reduction mechanism 14, it is necessary to perform the engagement and disengagement of the clutch mechanism at a relatively low rotational speed and a clutch mechanism with high precision which can complete engagement and disengagement by slight relative displacement should be employed. However, in the reaction force output device 10 according to the first embodiment, since the engagement and disengagement of the clutch mechanism 19 can be performed at a relatively high rotational speed as described above, it is possible to rapidly perform transmission and interception of power even when a relatively simple clutch mechanism 19 requiring relatively large displacement is used until the engagement and disengagement is completed.

In the clutch mechanism 19 employed by the reaction force output device 10 according to the first embodiment, the holder block 33 holding the clutch pins 35 to be movable forward and backward is coaxially disposed between the first rotary member 22 and the second rotary member 24 to be relatively rotatable, the clutch engagement portions 37 coming in contact with the tips of the clutch pins 35 at the time of protruding movement of the clutch pins 35 are disposed in the inner circumferential portion of the second rotary member 24, the clutch pins 35 are biased in the backward moving direction by the return spring 36, and the pressing blocks 38 of the first rotary member 22 come in contact with the base ends of the clutch pins 35 to press the clutch pins in the protruding direction at the time of rotation of the first rotary member 22 using the motor 12. Accordingly, it is possible to cause the rotation shaft 12a side of the motor 12 and the reaction force output shaft 13 side to engage with each other only at the time of activation of the motor 12 with a simple configuration.

Particularly, in the clutch mechanism 19 employed by the reaction force output device 10 according to the first embodiment, a plurality of clutch pins 35 and a plurality of clutch engagement portions 37 are provided, and the rotational phase of the first rotary member 22 and the second rotary member 24 when the tip of one clutch pin 35 comes in contact with the rising surface of one clutch engagement portion 37 and the rotational phase of the first rotary member 22 and the second rotary member 24 when the tip portion of the other clutch pin 35 comes in contact with another clutch engagement portion 37 located at a diagonal position of the one clutch engagement portion 37 are set to be offset from each other. Accordingly, when driving of the motor 12 is started, any one of one clutch pin 35 and the other clutch pin 35 on the holder block 33 comes in contact with the clutch engagement portion 37 on the second rotary member 24 side earlier. As a result, it is possible to realize rapid clutch engagement without increasing the number of clutch engagement portions 37 to be disposed on the second rotary member 24 side and thus to achieve simplification in structure of the second rotary member 24.

Since the clutch mechanism 19 employed in the first embodiment can realize the rapid clutch engagement without the number of clutch engagement portions 37 to be disposed on the second rotary member 24 side being increased as described above, it is possible to keep rigidity of each clutch engagement portion 37 high. That is, when the number of clutch engagement portions 37 is increased to realize rapid clutch engagement, the thickness of each clutch engagement portion 37 (the thickness in the direction parallel to the circumferential direction of the second rotary member 24) should be decreased and thus the rigidity of the individual clutch engagement portions 37 is decreased to that extent. However, since the clutch mechanism 19 employed in the first embodiment can realize the rapid clutch engagement without the number of clutch engagement portions 37 being increased, it is possible to keep the rigidity of each clutch engagement portion 37 high.

In the clutch mechanism 19 employed in the first embodiment, the rotational phase of the first rotary member 22 and the second rotary member 24 when the tip of one clutch pin 35 comes in contact with the rising surface of one clutch engagement portion 37 and the rotational phase of the first rotary member 22 and the second rotary member 24 when the tip portion of the other clutch pin 35 comes in contact with another clutch engagement portion 37 located at a diagonal position of the one clutch engagement portion 37 are set to be offset from each other by half a pitch angle θ of the neighboring clutch engagement portions 37 on the second rotary member 24 side. Accordingly, while the first rotary member 22 and the second rotary member 24 relatively rotate at least by half the pitch angle θ of the clutch engagement portions 37 at the time of driving start of the motor 12, any one of one clutch pin 35 and the other clutch pin 35 can be brought into satisfactory contact with the clutch engagement portions 37. As a result, it is possible to rapidly and efficiently perform engagement of the clutch mechanism 19 at the time of driving start of the motor 12.

The present invention is not limited to the above-mentioned embodiment, but can be modified in various designs without departing from the gist thereof. For example, in the first embodiment, the reaction force output device is used for an acceleration pedal of a vehicle, but the reaction force output device may be applied to an operation pedal of a vehicle other than the accelerator pedal, an operation pedal of a simulation device, or the like.

Second Embodiment

Figure 12:
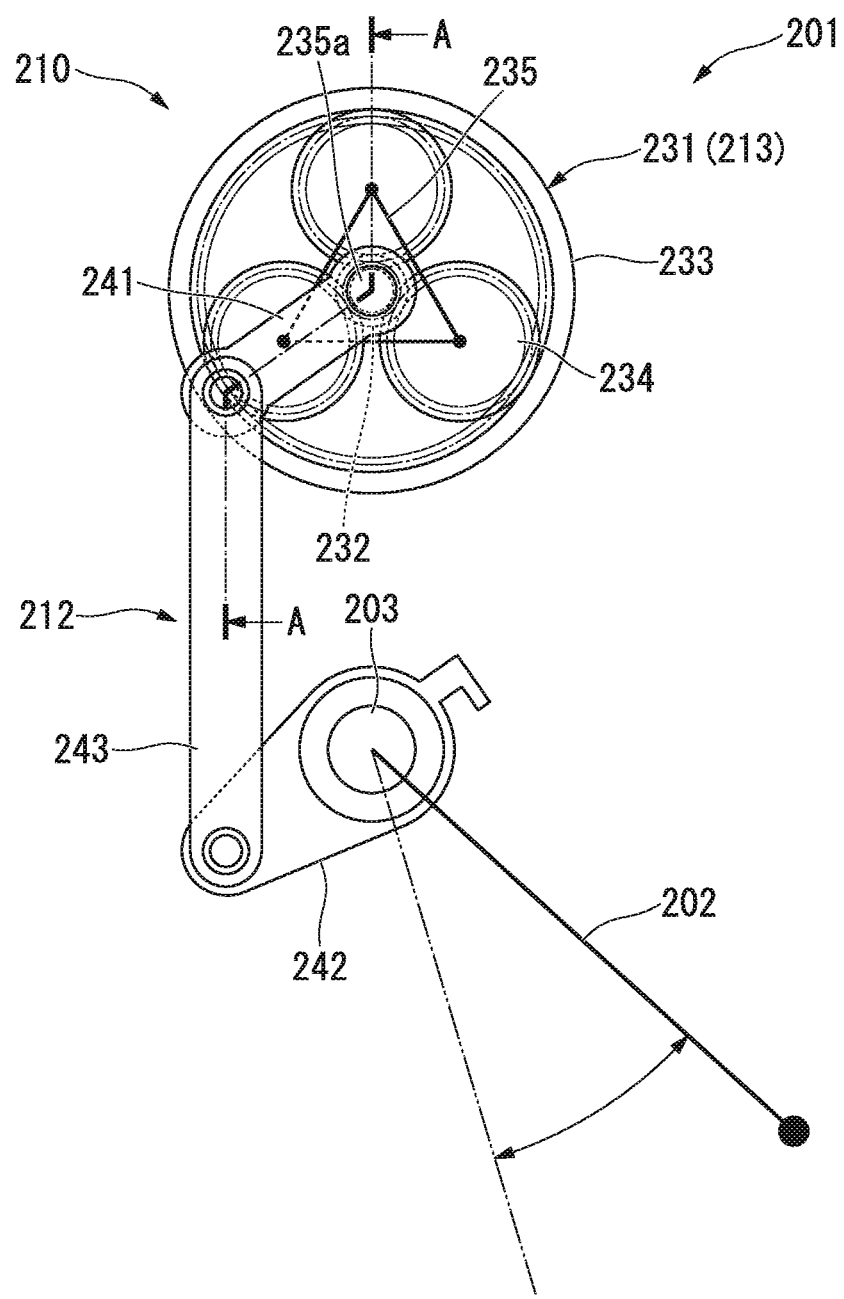
FIG. 12 is a diagram schematically illustrating a configuration of an accelerator pedal device having a reaction force output device according to a second embodiment of the present invention mounted thereon.

An example in which a reaction force output device 210 according to a second embodiment of the present invention is mounted on an accelerator pedal device 201 of a vehicle will be described below. FIG. 12 is a diagram schematically illustrating a configuration of the accelerator pedal device 201 of a vehicle and FIG. 13 is a partial cross-sectional view taken along line A-A in FIG. 12.

Figure 13:
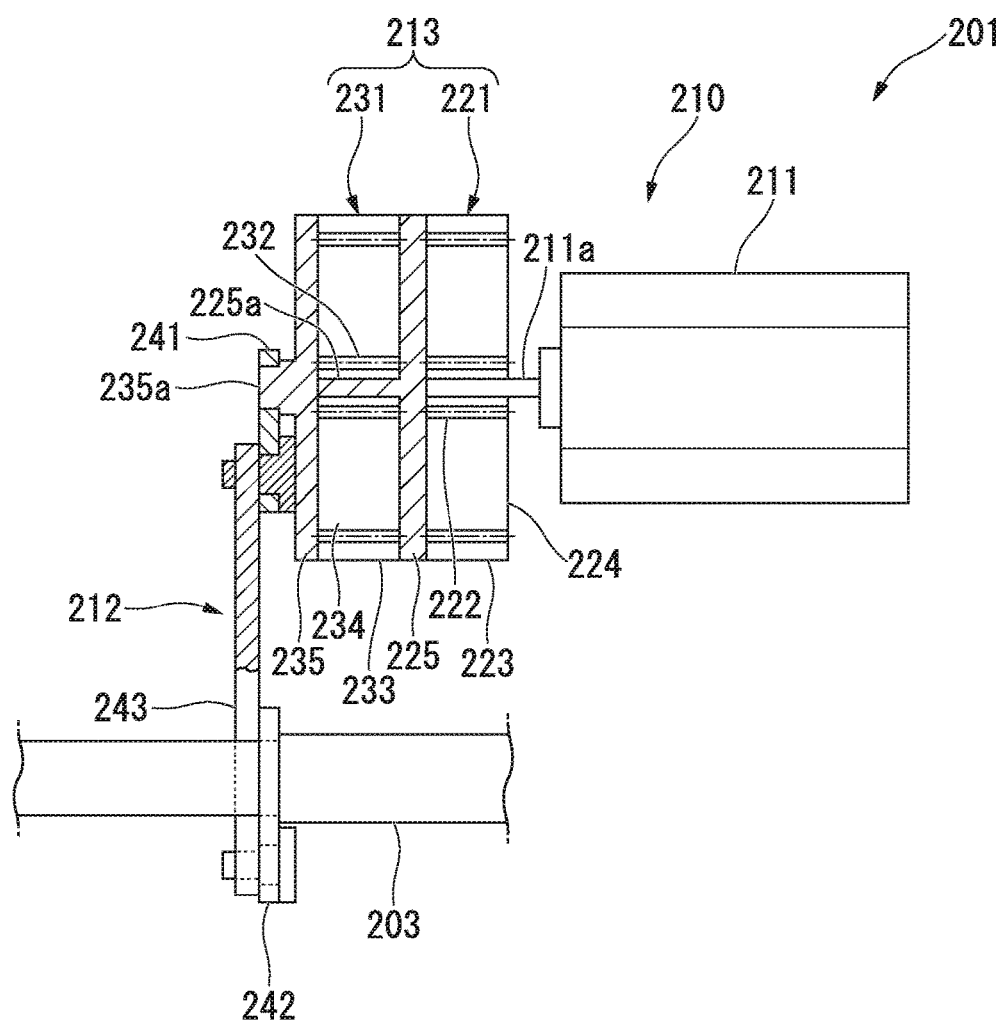
FIG. 13 is a partial cross-sectional view taken along line A-A in FIG. 12.

As illustrated in FIGS. 12 and 13, the accelerator pedal device 201 includes a pedal body (operation unit) 202 that is disposed in front of a foot of a driver seat and a reaction force output device 210 that is connected to the pedal body 202.

The pedal body 202, the base end of which is fixed to a spindle 203 which is rotatably supported, is configured to rotate along with the spindle 203 when a driver's depressing force is applied to the tip thereof. The pedal body 202 is normally biased to an initial position (the position of the pedal body 202 in FIG. 12) by a return spring (not illustrated). The pedal body 202 is connected to a cable (not illustrated) for adjusting a degree of opening of a throttle valve (not illustrated) of an internal combustion engine depending on a degree of operation (rotational angle) of the pedal body 202. When the internal combustion engine employs an electronically controlled throttle, a rotation sensor that detects the rotational angle of the pedal body 202 may be provided to control the degree of opening of the throttle valve based on a detection signal of the rotation sensor.

As illustrated in FIG. 13, the reaction force output device 210 includes a motor 211 as a drive source that creates a reaction force, a reaction force transmission unit 212 that transmits a reaction force to the pedal body 202, a reduction mechanism 213 that is disposed between a rotation shaft 211a of the motor 211 and the reaction force transmission unit 212 and reduces rotation of the motor 211 to increase a torque and transmits the increased torque to the reaction force transmission unit 212, and a clutch mechanism 214 (see FIG. 14) that switches transmission and interception of a reaction force to the reaction force transmission unit 212 between the reduction mechanism 213 and the reaction force transmission unit 212. In the accelerator pedal device 201 according to the second embodiment, at least the reaction force output device 210 and the spindle 203 are received in a housing (not illustrated).

The reduction mechanism 213 includes a first planetary gear mechanism 221 and a second planetary gear mechanism 231 that are disposed coaxially with the rotation shaft 211a of the motor 211. In the following description, the motor 211 side in the axial direction of the rotation shaft 211a is defined as one end and the reduction mechanism 213 side is defined as the other end. The direction perpendicular to the rotation shaft 211a is defined as a radial direction and the direction around the rotation shaft 211a is defined as a circumferential direction.

The first planetary gear mechanism 221 includes three rotary elements of a first sun gear 222, a first ring gear 223 that is disposed coaxially with the first sun gear 222, and a first carrier 225 that engages the first sun gear 222 and the first ring gear 223 and rotatably supports a plurality of first planetary gears 224 disposed to revolve around the first sun gear 222.

The second planetary gear mechanism 231 has the same configuration as the first planetary gear mechanism 221 and includes three rotary elements of a second sun gear (first rotary element) 232, a second ring gear (third rotary element) 233 that is disposed coaxially with the second sun gear 232, and a second carrier (second rotary element) 235 that engages the second sun gear 232 and the second ring gear 233 and rotatably supports a plurality of second planetary gears 234 disposed to revolve around the second sun gear 232. In FIG. 12 or the drawings subsequent to FIG. 14, for the purpose of easy understanding of the configurations of the second sun gear 232 and the second planetary gears 234, the second carrier 235 is illustrated as a triangle connecting the centers of the second planetary gears 234.

The first sun gear 222 among the rotary elements 222, 223, and 225 of the first planetary gear mechanism 221 is connected to the rotation shaft 211a of the motor 211. The first ring gear 223 is irrotatably fixed to the housing. A first output shaft 225a rises to one end in the axial direction from the central portion in the radial direction of the first carrier 225, and the second sun gear 232 of the second planetary gear mechanism 231 is connected to the first output shaft 225a.

The second sun gear 232 among the rotary elements 232, 233, and 235 of the second planetary gear mechanism 231 is connected to the first output shaft 225a of the first carrier 225 as described above and a torque from the motor 211 is input thereto. The second ring gear 233 is configured to rotate with the operation of the pedal body 202 (the reaction force transmission unit 212) or the operation of the motor 211 (detailed operation of which will be described later). A second output shaft 235a rises to one end in the axial direction from the central portion in the radial direction of the second carrier 235, and the reaction force transmission unit 212 is connected to the second output shaft 235a.

The reaction force transmission unit 212 includes a reduction-mechanism-side arm 241 fixed to the second output shaft 235a, a spindle-side arm 242 fixed to the spindle 203, and a link arm 243 connecting the arms 241 and 242.

One end of the reduction-mechanism-side arm 241 is fixed to the second output shaft 235a and one end of the link arm 243 is rotatably supported by the other end thereof. One end of the spindle-side arm 242 is fixed to the spindle 203 and the other end of the link arm 243 is rotatably supported by the other end thereof. Accordingly, one arm 241 or 242 among the arms 241 and 242 operates in conjunction with the operation of the other arm 241 or 242.

Figure 14:
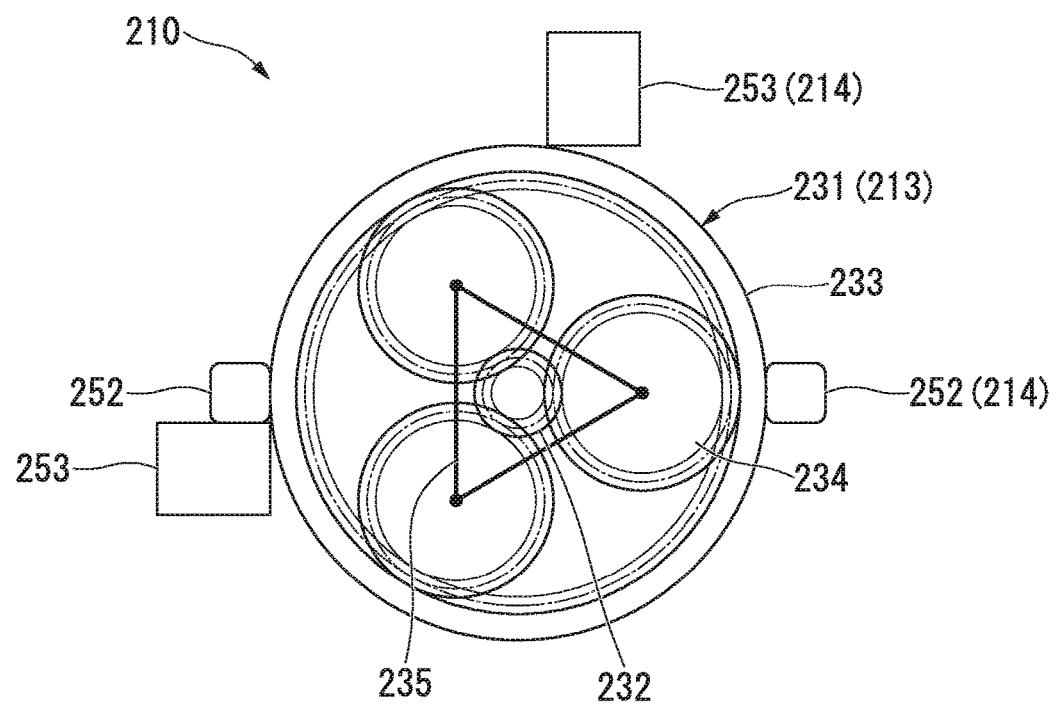
FIG. 14 is a plan view of a reaction force output device illustrating an initial state of a second planetary gear mechanism and a clutch mechanism.

FIG. 14 is a plan view of the reaction force output device 210 illustrating initial states of the second planetary gear mechanism 231 and the clutch mechanism 214.

As illustrated in FIG. 14, the clutch mechanism 214 includes a protrusion 252 that protrudes outward in the radial direction from the second ring gear 233 and a stopper 253 that is formed at a position overlapping the protrusion 252 in the circumferential direction in the housing to come in contact with the protrusion 252.

Two protrusions 252 are disposed at an interval of 180° in the circumferential direction in the second ring gear 233.

Two stoppers 253 are disposed at an interval of 90° on a narrower angle side of the central angles formed by the protrusions 252 centered on the rotation shaft 211a. In the example illustrated in FIG. 14, one protrusion 252 of the protrusions 252 is disposed between the stoppers 253.

The protrusions 252 rotate along with the second ring gear 233 with the rotation of the second ring gear 233 and regulate the rotation of the second ring gear 233 by coming in contact with any one stopper 253.

Figure 17:
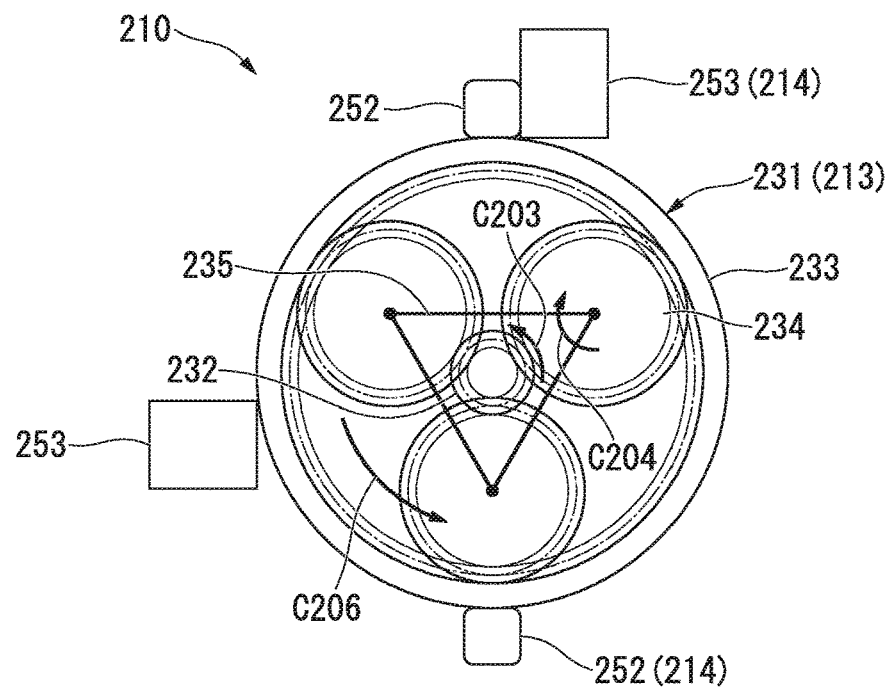
FIG. 17 is a plan view corresponding to FIG. 14 illustrating an operation in the reaction force control.

The interval between the stoppers 253 in the circumferential direction is set to be equal to the rotational angle of the second ring gear 233 corresponding to the rotation of the pedal body 202 from the initial position to a full-stroke position. That is, one protrusion 252 comes in contact with one stopper 253 when the pedal body 202 is located at the initial position, and the one protrusion 252 comes in contact with the other stopper 253 when the pedal body 202 is located at the full-stroke position. In the second embodiment, a state in which one protrusion 252 comes in contact with the other stopper 253 as illustrated in FIG. 17 is referred to as an engaged state of the clutch mechanism 214, and a state in which one protrusion 252 is separated from the other stopper 253 in the circumferential direction as illustrated in FIG. 14 is referred to as a disengaged state of the clutch mechanism 214.

<Operation>

Figure 15:
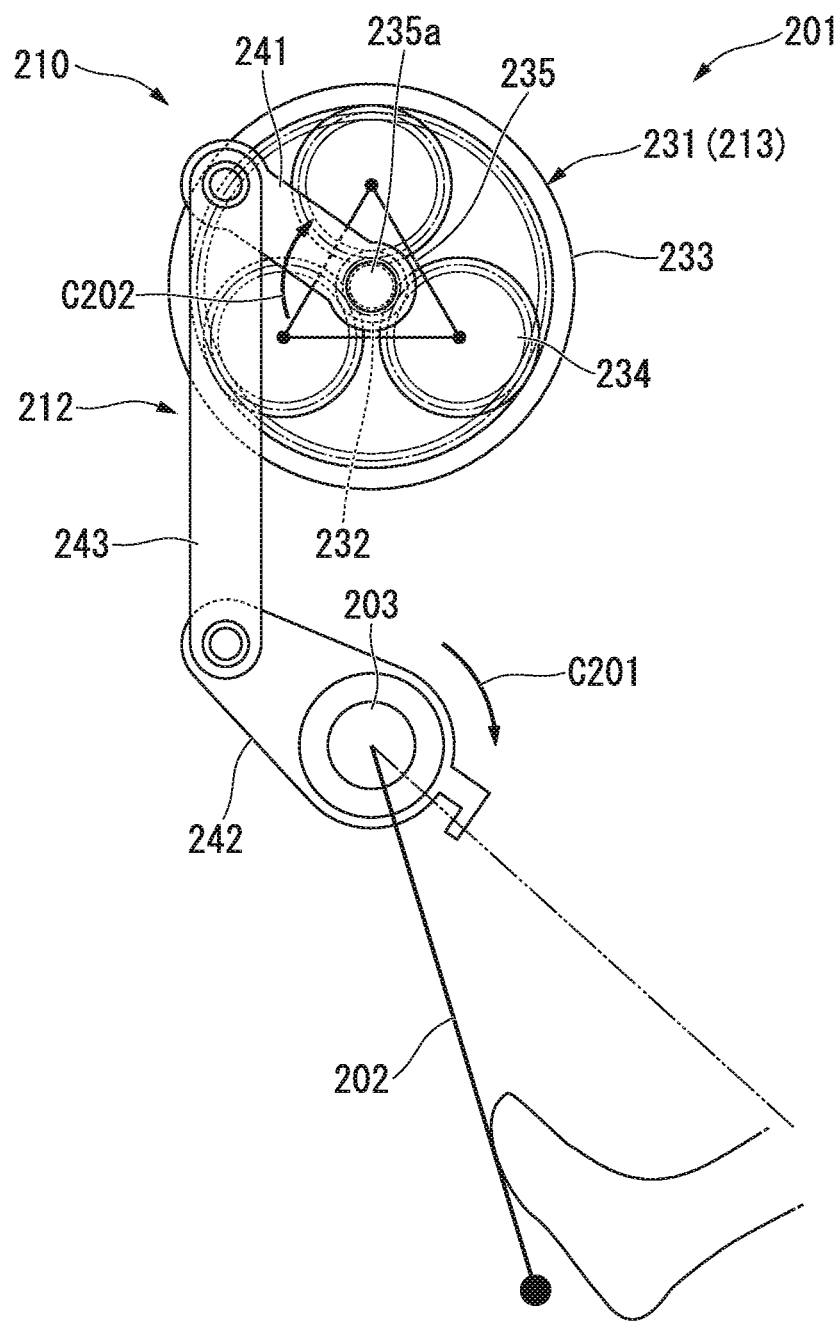
FIG. 15 is a schematic configuration diagram illustrating a state in which a pedal body is depressed and corresponding to FIG. 12.

The operation of the accelerator pedal device 201 will be described below. FIG. 15 is a configuration diagram schematically illustrating a state in which the pedal body 202 is depressed and corresponds to FIG. 12.

As illustrated in FIG. 15, when the pedal body 202 is depressed by a driver in a direction against the biasing force of the return spring, the spindle 203 rotates in the direction of C201 along with the pedal body 202 and the degree of opening of the throttle valve of the internal combustion engine is adjusted based on the rotational angle thereof. When the pedal body 202 rotates in the direction of C201 from the initial position, the spindle-side arm 242 fixed to the spindle 203 rotates along with the spindle 203 and thus the reduction mechanism-side arm 241 rotates in the direction of C202 along with the second carrier 235 via the link arm 243.

When it is determined that the pedal body 202 is excessively depressed depending on the depression speed of the pedal body 202 or the driving condition of the vehicle, reaction control using the reaction force output device 210 is started. Specifically, when the motor 211 of the reaction force output device 210 is driven as illustrated in FIG. 13, the torque of the motor 211 is transmitted to the first sun gear 222 of the first planetary gear mechanism 221 and the first sun gear 222 rotates. When the first sun gear 222 rotates, the first planetary gear 224 rotates on its axis and revolves around the first sun gear 222, whereby the first carrier 225 rotates.

FIGS. 16 to 20 are diagrams illustrating the operation of the reaction force output device 210 and are plan views corresponding to FIG. 14.

Figure 16:
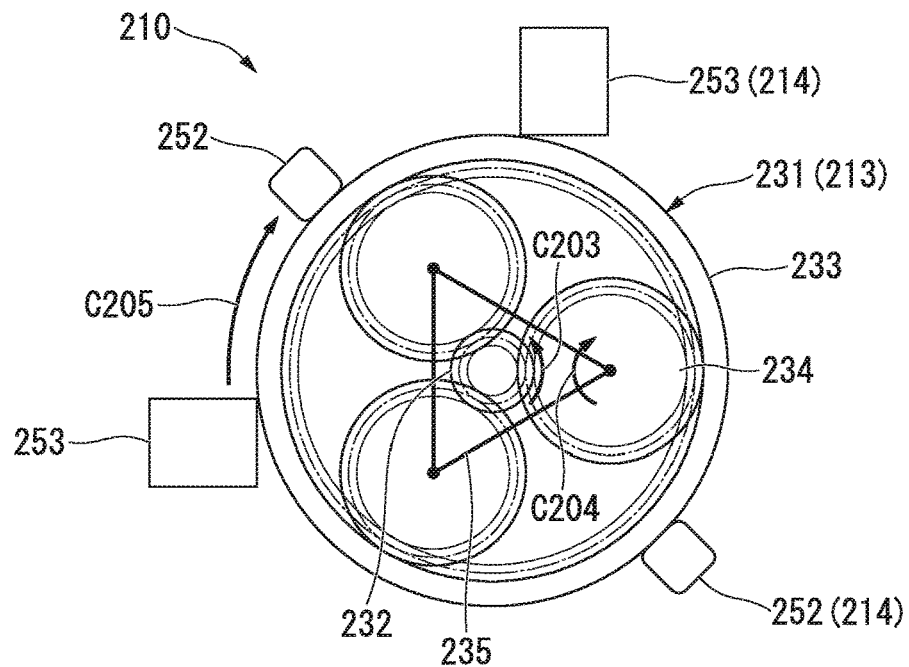
FIG. 16 is a plan view corresponding to FIG. 14 illustrating an operation when reaction force control is performed in the initial state illustrated in FIG. 14.

When the first carrier 225 rotates as illustrated in FIG. 16, the second sun gear 232 connected to the first output shaft 225a of the first carrier 225 rotates in the direction of C203 and thus the second planetary gear 234 rotates on its axis in the direction of C204. When the second planetary gear 234 rotates on its axis in the direction of C204, the second ring gear 233 rotates in the direction of C205. That is, when the clutch mechanism 214 is in the disengaged state illustrated in FIG. 16, the second ring gear 233 can rotate with the operation of the motor 211. Accordingly, the second planetary gear 234 does not revolve and the second ring gear 233 rotates in the direction of C205.

When the rotation of the second ring gear 233 in the direction of C205 further progresses as illustrated in FIG. 17, one protrusion 252 in the clutch mechanism 214 comes in contact with the other stopper 253 and the rotation of the second ring gear 233 in the direction of C205 is regulated. Accordingly, the clutch mechanism 214 is switched to the engaged state. When the rotation of the second ring gear 233 in the direction of C205 is regulated, the second planetary gear 234 rotates on its axis in the direction of C204 and revolves around the second sun gear 232. As a result, the torque of the motor 211 is output as a reaction force in the direction of C206 from the second carrier 235 to the reaction force transmission unit 212.

Figure 21:
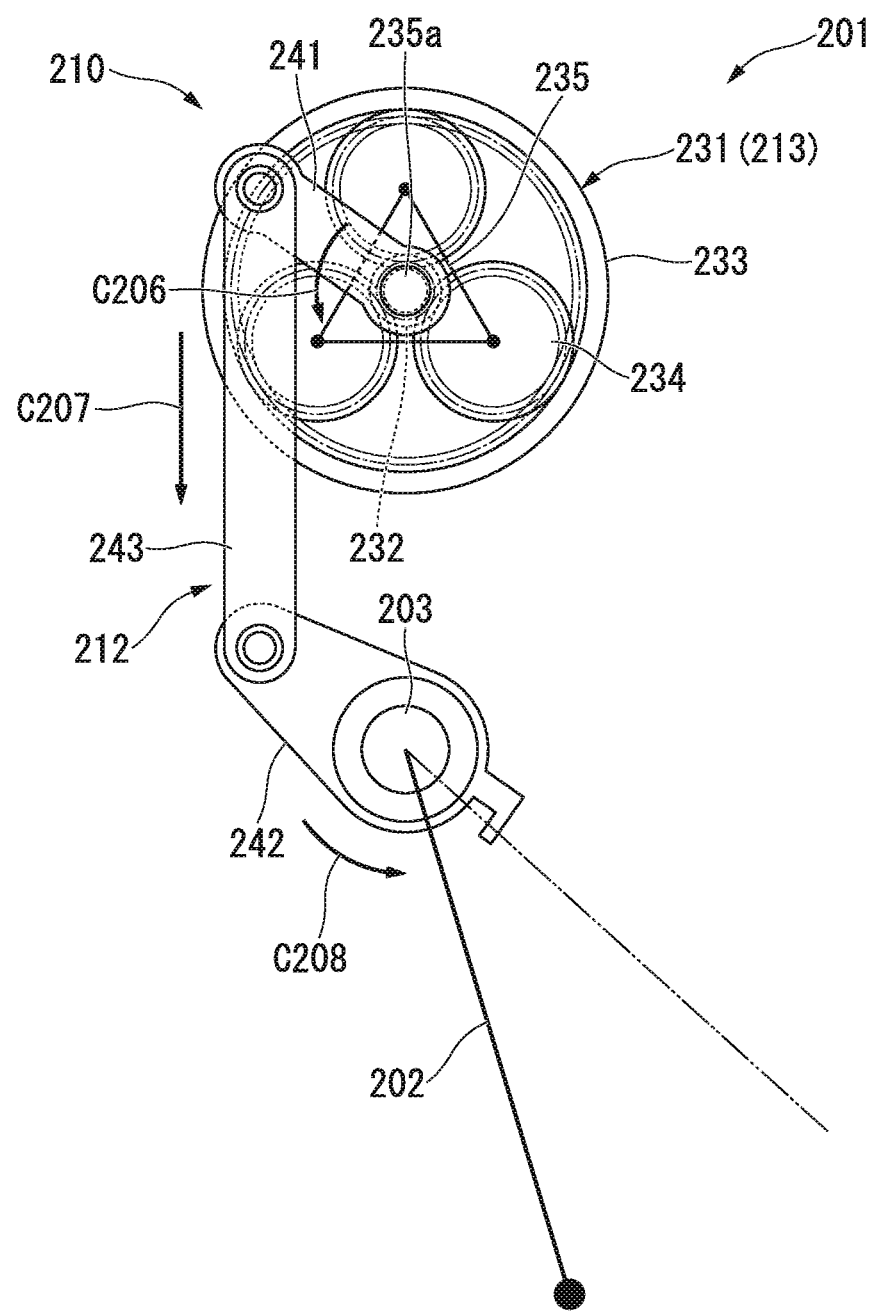
FIG. 21 is a diagram schematically illustrating an operation in the reaction force control and corresponding to FIG. 15.

FIG. 21 is a configuration example schematically illustrating the operation in the reaction force control and corresponds to FIG. 15.

As illustrated in FIG. 21, the reaction force output from the second carrier 235 is transmitted to the spindle 203 (in the direction of arrow C207 in the drawing) via the reaction force transmission unit 212 and is transmitted in the return direction (the direction of arrow C208 in the drawing) of the return spring in the spindle 203. Accordingly, a reaction force directed to the initial position acts on the pedal body 202. At this time, since a torque corresponding to the depression speed of the pedal body 202 or the driving condition of the vehicle is output from the motor 211 to the pedal body 202, the driver is informed of information such as an acceleration state of the internal combustion engine or "excessive depression" through the sole of her or his foot depressing the pedal body 202.

When the driving of motor 211 is stopped by releasing the driver's depression force on the pedal body 202 from the reaction force control state illustrated in FIG. 16 or the like, the spindle 203 rotates in the direction of C208 (see FIG. 21) by the restoring force of the return spring. Accordingly, the pedal body 202 rotates to the initial position and the second carrier 235 rotates in the direction of C206 via the reaction force transmission unit 212.

Figure 18:
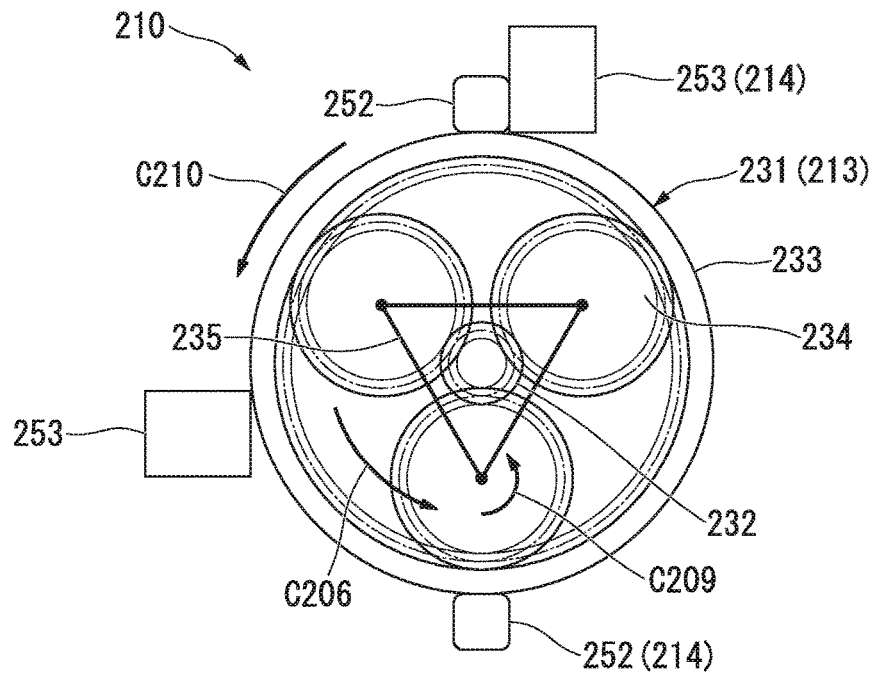
FIG. 18 is a plan view corresponding to FIG. 14 illustrating an operation when reaction force control is released in the state illustrated in FIG. 16.

When the second carrier 235 rotates in the direction of C206 as illustrated in FIG. 18, the second planetary gear 234 revolves around the second sun gear 232 and rotates on its axis in the direction of C209. Accordingly, the second ring gear 233 rotates in the direction of C210 and one protrusion 252 is separated from the other stopper 253. As a result, the clutch mechanism 214 is switched to the disengaged state in which the rotation of the second ring gear 233 is allowed. That is, since the second sun gear 232 is connected to the motor 211 via the first planetary gear mechanism 221, the torque required for the rotation of the second ring gear 233 is smaller than the torque required for the rotation of the second sun gear 232 in the disengaged state of the clutch mechanism 214. Accordingly, the rotation of the second sun gear 232 due to the rotation of the second planetary gear 234 can be suppressed and the second ring gear 233 can rotate preferentially.

At the timing at which the pedal body 202 is returned to the initial position, the protrusions 252 are returned to the state illustrated in FIG. 14.

Figure 19:
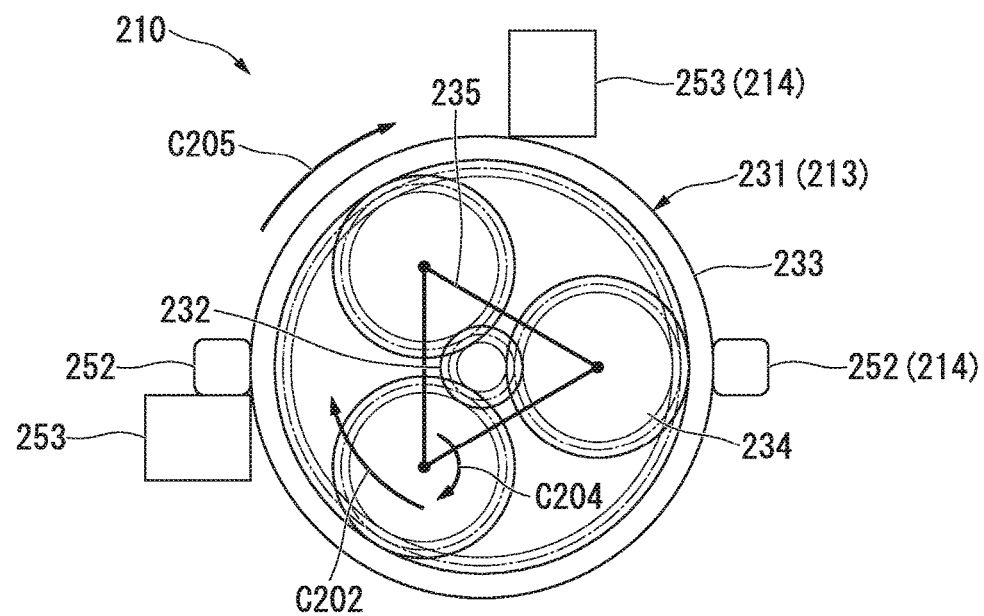
FIG. 19 is a plan view corresponding to FIG. 14 illustrating an operation when the pedal body is depressed to such an extent that the reaction force control is not performed in the initial state illustrated in FIG. 14.

When the pedal body 202 is depressed to such an extent that the reaction force control using the reaction force output device 210 is not performed, the spindle 203 rotates in the direction of C201 as illustrated in FIG. 15, and thus the reaction force transmission unit 212 operates and the second carrier 235 rotates in the direction of C202 via the reaction force transmission unit 212. Accordingly, as illustrated in FIG. 19, the second planetary gear 234 rotates on its axis in the direction of C204 and revolves around the second sun gear 232. At this time, as described above, since the torque required for the rotation of the second ring gear 233 in the disengaged state of the clutch mechanism 214 is smaller than the torque required for the rotation of the second sun gear 232, the second sun gear 232 does not rotate and the second ring gear 233 rotates preferentially in the direction of C205 (see FIG. 20).

Therefore, even when the pedal body 202 is depressed by the driver and the reaction force transmission unit 212 operates via the spindle 203, the rotation shaft 211a of the motor 211 does not rotate accordingly. As a result, the rotational friction such as a cogging torque of the motor 211 does not affect the rotational operation of the pedal body 202.

Figure 20:
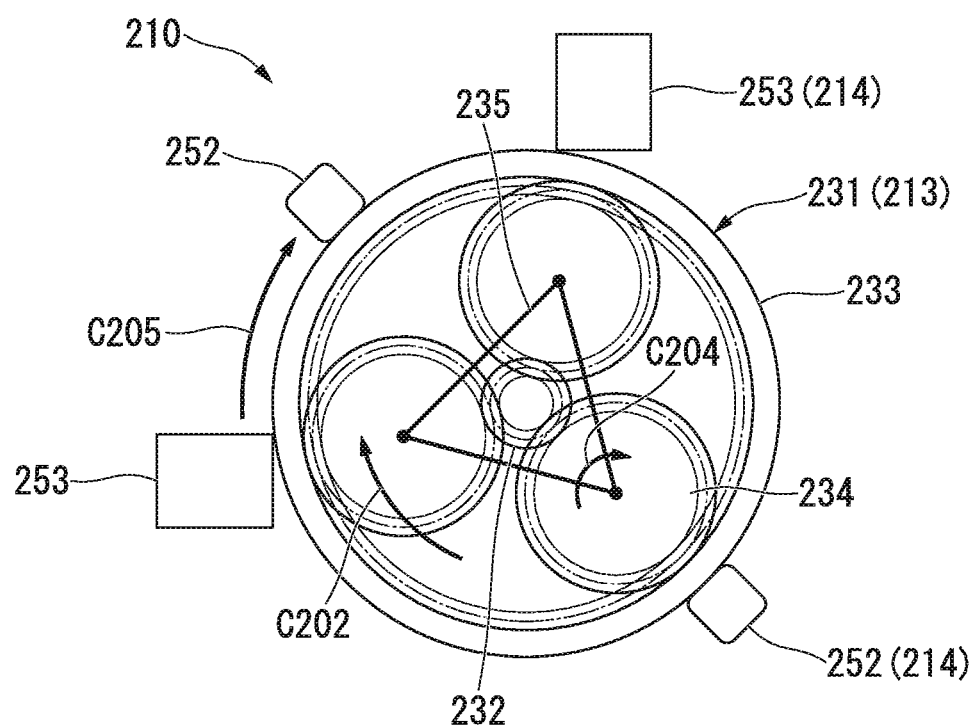
FIG. 20 is a plan view corresponding to FIG. 14 illustrating an operation when the pedal body is depressed to such an extent that the reaction force control is not performed in the initial state illustrated in FIG. 14.

When the depression of the pedal body 202 is released from the state illustrated in FIG. 20 and the pedal body 202 is returned to the initial position by the restoring force of the return spring, the pedal body 202 is returned to the initial position through the same operation as described above with reference to FIG. 18.

In this way, according to the second embodiment, it is possible to prevent the rotational friction of the motor 211 side from acting on the reaction force transmission unit 212 (the pedal body 202) side when the reaction force control using the motor 211 is not performed, and it is thus possible to improve an operating feeling when the reaction force control using the motor 211 is not performed.

When the depression of the pedal body 202 is released, the pedal body 202 is rapidly returned to the initial position without being affected by the rotational friction of the motor 211. Accordingly, since the spring force of the return spring can be suppressed, it is possible to suppress a depression load of the pedal body 202.

In the second embodiment, since a plurality of planetary gear mechanisms 221 and 231 are provided, it is possible to achieve a decrease in size and cost of the motor 211 and thus to output a high torque to the reaction force transmission unit 212.

The clutch mechanism 214 is disposed on the second planetary gear mechanism 231 side. Accordingly, when the reaction force transmission unit 212 operates due to the operation of the pedal body 202 or the like when the driving of the motor 211 is stopped, it is possible to operate the reaction force transmission unit 212 without it being affected by the rotational friction of the first planetary gear mechanism 221. As a result, it is possible to achieve additional improvement in operability.

Third Embodiment

A third embodiment of the present invention will be described below. In the third embodiment, a case in which the reaction force output device 210 is applied to a vehicle door 100 (hereinafter, simply referred to as a door 100) will be described. In the following description, a right front door of a vehicle will be exemplified. The front, rear, top, bottom, right, and left sides in the following description are the same as the directions of the vehicle unless particularly mentioned. In the following description, the reference signs or functions in the second embodiment will be appropriately used and description thereof will not be repeated.

Figure 22:
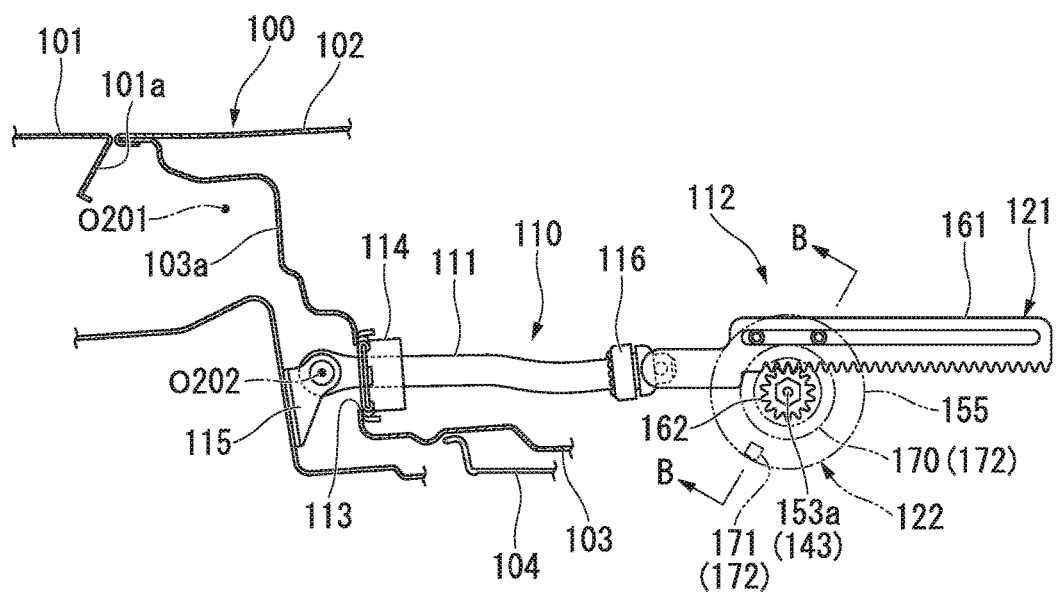
FIG. 22 is a cross-sectional view illustrating a closed position of a vehicle door employing a reaction force output device according to a third embodiment of the present invention.

FIG. 22 is a cross-sectional view illustrating a closed position of the door 100.

As illustrated in FIG. 22, the door 100 is disposed to open and close a door opening 101a of a vehicle body 101 and principally includes a door outer panel 102 and a door inner panel 103 that are superimposed in a vehicle width direction and a door lining 104 that is attached to the door inner panel 103 from the inside in the vehicle width direction.

The door outer panel 102 is formed by press machining and the like and the outer surface thereof constitutes an outside front surface of the door 100.

The door inner panel 103 is formed by press machining or the like and is disposed with a gap in the vehicle width direction from the door outer panel 102. The front portion of the door inner panel 103 includes a front wall portion 103a that is bent to the outside in the vehicle width direction and the front end of the front wall portion 103a is bonded to the front end of the door outer panel 102. The door 100 is supported by the vehicle body 101 such that the front wall portion 103a of the door inner panel 103 is rotatable about a rotation shaft O201.

A door checker (operation unit) 110 that adjusts a degree of opening of the door 100 is interposed between the door 100 and the vehicle body 101. The door checker 110 includes a link arm 111 that links the vehicle body 101 and the door 100 and a reaction force output device 112 that is connected to the link arm 111 in the door 100.

The link arm 111 extends in the front-rear direction along the inner surface of the door inner panel 103 and is supported via a bush 114 in a through-hole 113 formed in the front wall portion 103a of the door inner panel 103 to be movable in the front-rear direction. The tip of the link arm 111 protrudes outward from the door 100 via the through-hole 113 and is supported by a bracket 115 attached to the vehicle body 101 to be rotatable about a rotation shaft O202 parallel to the rotation shaft O201. On the other hand, the base end of the link arm 111 is provided with a stopper 116 that prevents drop from the bush 114.

Figure 23:
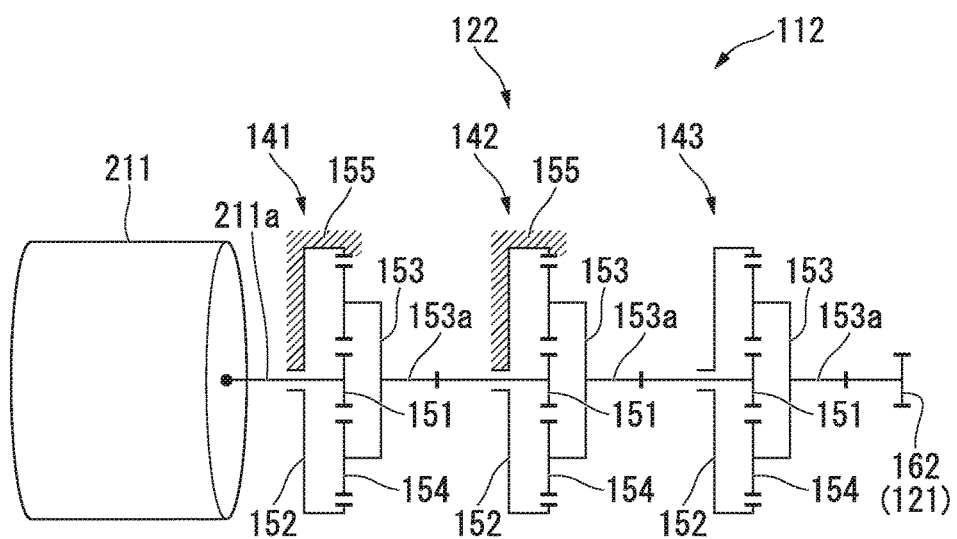
FIG. 23 is a diagram schematically illustrating a configuration of the reaction force output device according to the third embodiment of the present invention.

FIG. 23 is a diagram schematically illustrating a configuration of the reaction force output device 112 according to the third embodiment of the present invention. As illustrated in FIGS. 22 and 23, the reaction force output device 112 includes a motor 211 as a drive source that creates a reaction force, a reaction force transmission unit 121 (see FIG. 22) that transmits a reaction force to the link arm 111, a reduction mechanism 122 that is interposed between a rotation shaft 211a of the motor 211 and the reaction force transmission unit 121, reduces rotation of the motor 211 to increase a torque, and transmits the increased torque to the reaction force transmission unit 121, and a clutch mechanism 214 (see FIG. 14) that switches transmission and interception of a reaction force to the reaction force transmission unit 121 between the reduction mechanism 122 and the reaction force transmission unit 121. The motor 211, the reduction mechanism 122, and the clutch mechanism 214 of the reaction force output device 112 are received in a housing 155.

As illustrated in FIG. 23, the reduction mechanism 122 includes a first planetary gear mechanism 141, a second planetary gear mechanism 142, and a third planetary gear mechanism 143 which are disposed coaxially with the rotation shaft 211a of the motor 211. Each of the planetary gear mechanisms 141 to 143 has the same configuration as the planetary gear mechanisms 221 and 231 in the second embodiment and includes three rotary elements of a sun gear (first rotary element) 151, a ring gear (third rotary element) 152, and a carrier 153, and a plurality of planetary gears 154 engaging with the sun gear 151 and the ring gear 152 are supported by the carrier (second rotary element) 153 to rotate on their axes and to revolve.

Among the rotary elements 151 to 153 of the first planetary gear mechanism 141, the sun gear 151 is connected to the rotation shaft 211*a* of the motor 211, and the ring gear 152 is fixed to the housing 155. The carrier 153 is connected to the sun gear 151 of the second planetary gear mechanism 142 via an output shaft 153*a* thereof.

Among the rotary elements 151 to 153 of the second planetary gear mechanism 142, the sun gear 151 is connected to the output shaft 153*a* of the carrier 153 of the first planetary gear mechanism 141 as described above, and the ring gear 152 is fixed to the housing 155. The carrier 153 is connected to the sun gear 151 of the third planetary gear mechanism 143 via the output shaft 153*a*.

Among the rotary elements 151 to 153 of the third planetary gear mechanism 143, the sun gear 151 is connected to the output shaft 153*a* of the carrier 153 of the second planetary gear mechanism 142 as described above, and the ring gear 152 is configured to rotate with the operation of the door checker 110 or the operation of the motor 211. The carrier 153 is connected to the reaction force transmission unit 121 via the output shaft 153*a*.

Since the clutch mechanism 214 has the same configuration as in the second embodiment, the clutch mechanism includes a protrusion 252 that is disposed in the ring gear 152 of the third planetary gear mechanism 143 and a stopper 253 that is formed at a position overlapping the protrusion 252 in the circumferential direction of the housing 155 and that can come in contact with the protrusion 252, as described above with reference to FIG. 14.

As illustrated in FIG. 22, the reaction force transmission unit 121 constitutes a so-called rack & pinion mechanism and includes a rack 161 that is supported by the base end of the link arm 111 and a pinion 162 that engages with the rack 161.

The rack 161 is configured to extend along an extension line of the link arm 111 and to be movable in the front-rear direction in conjunction with the link arm 111.

The pinion 162 is connected to the output shaft 153*a* of the carrier 153 of the third planetary gear mechanism 143 and is configured to be rotatable with the movement of the rack 161.

Figure 24:
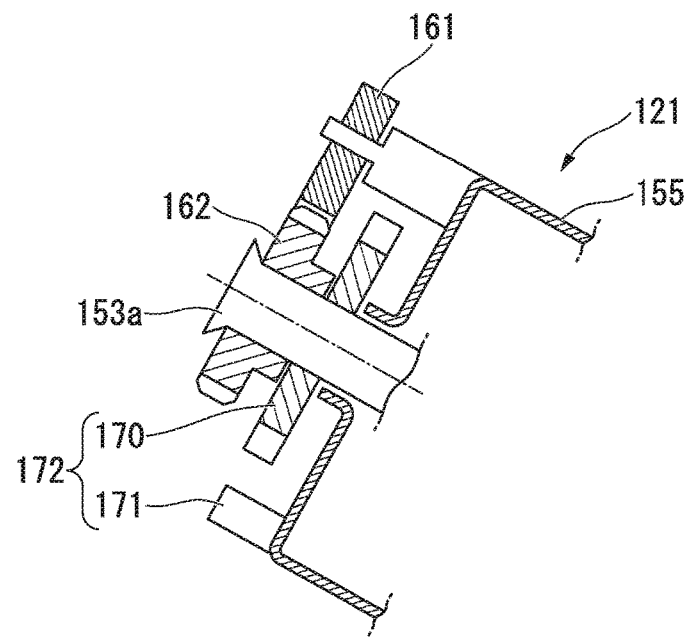
FIG. 24 is a cross-sectional view taken along line B-B in FIG. 22.

FIG. 24 is a cross-sectional view taken along line B-B in FIG. 22.

As illustrated in FIG. 24, the reaction force output device 112 according to the third embodiment includes a rotation sensor 172 that detects a rotational speed or a rotational angle of the output shaft 153*a*. Specifically, the rotation sensor 172 includes a rotation detection gear 170 that is formed of a magnetic member fixed to the output shaft 153*a* and a Hall IC 171 that is fixed to a position facing the rotation detection gear 170 in the radial direction in the housing 155. The rotation sensor 172 detects the rotational speed or the rotational angle of the output shaft 153*a* based on a variation in magnetic flux penetrating the Hall IC 171 when a convex portion and a concave portion of the rotation detection gear 170 pass through the Hall IC 171. Accordingly, it is possible to detect a closing speed of the door when the door is rapidly closed due to a manual operation, a sloping road, strong wind, or the like.

Figure 25:
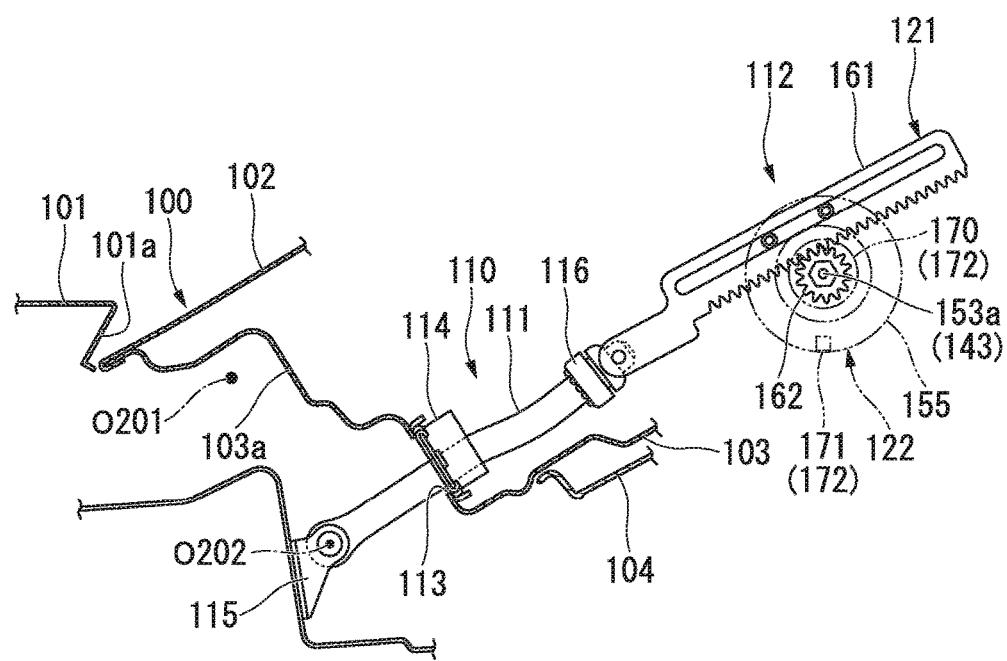
FIG. 25 is a cross-sectional view illustrating an opened position of the vehicle door.

In the door 100 having the above-mentioned configuration, when the door 100 rotates about the rotation shaft O201 from the closed position illustrated in FIG. 22 to the open position illustrated in FIG. 25, the link arm 111 rotates about the rotation shaft O202 in conjunction with the rotational operation of the door 100. The link arm 111 protrudes forward from the door 100 and the rack 161 moves forward with the movement of the link arm 111, whereby the pinion 162 rotates. Accordingly, the door 100 is located at the open position illustrated in FIG. 25.

On the other hand, when the door 100 rotates about the rotation shaft O201 from the open position illustrated in FIG. 25 to the closed position illustrated in FIG. 22, the link arm 111 rotates about the rotation shaft O202 in conjunction with the rotational operation of the door 100. The link arm 111 retreats into the door 100 and the rack 161 moves backward with the movement of the link arm 111, whereby the pinion 162 rotates. Accordingly, the door 100 is located at the closed position illustrated in FIG. 22.

For example, when an excessively high closing speed of the door 100 is detected by the rotation sensor 172 in closing the door 100, the reaction force control using the reaction force output device 112 is started. Specifically, the torque of the motor 211 is reduced by the first planetary gear mechanism 141 and the second planetary gear mechanism 142 and is then input to the sun gear 151 of the third planetary gear mechanism 143. Accordingly, when the sun gear 151 of the third planetary gear mechanism 143 rotates, the planetary gear 154 rotates on its axis with the rotation and thus the ring gear 152 rotates.

Thereafter, the rotation of the ring gear 152 progresses, the protrusion 252 of the ring gear 152 (see FIG. 14) comes in contact with the stopper 253 of the housing 155 (see FIG. 14), and the clutch mechanism 214 (see FIG. 14) is switched to an engaged state. As a result, since the rotation of the ring gear 152 is regulated, the planetary gear 154 rotates on its axis and revolves around the sun gear 151. Accordingly, the torque of the motor 211 is output as a reaction force from the carrier 153 to the pinion 162 (the reaction force transmission unit 121).

The reaction force output from the carrier 153 to the pinion 162 is transmitted to the rack 161 via the pinion 162 and then acts on the link arm 111 forward (in the opening direction).

As a result, it is possible to decrease the closing speed of the door 100 and thus to smoothly close the door 100.

When the door 100 is closed at such a closing speed that the reaction force control using the reaction force output device 112 is not performed, the pinion 162 rotates with the movement of the link arm 111 and the rack 161 in the closing direction (backward) and thus the carrier 153 of the third planetary gear mechanism 143 rotates. Accordingly, the planetary gear 154 rotates on its axis and revolves around the sun gear 151.

That is, when the clutch mechanism 214 is in the disengaged state in which the rotation of the ring gear 152 is allowed, the torque required for the rotation of the ring gear 152 is smaller than the torque required for the rotation of the sun gear 151. Accordingly, the sun gear 151 does not rotate but the ring gear 152 rotates preferentially.

Therefore, even when the door 100 is closed and the reaction force transmission unit 121 operates via the link arm 111, the rotation shaft 211*a* of the motor 211 does not rotate therewith. Accordingly, the rotational friction such as a cogging torque of the motor 211 does not affect the rotational operation of the door 100.

In this way, in the third embodiment, since the operational advantages as in the second embodiment can be exhibited, it is possible to improve an operating feeling when the reaction force control using the motor 211 is not performed. The reaction force control in the closing operation was described above in the third embodiment, but the present invention is not limited to this configuration and the reaction force control can be performed in common on the opening operation or both the closing operation and the opening operation.

While embodiments of the present invention have been described in detail with reference to the drawings, the specific configuration is not limited to these embodiments but includes modifications in design without departing from the gist of the present invention.

For example, the configuration in which two stages or three stages of planetary gear mechanisms are provided has been described in the second and third embodiments, but the present invention is not limited to this configuration and a configuration in which one stage or four or more stages are provided may be employed.

The configuration in which the reaction force output device 210 or 112 according to the present invention is applied to the accelerator pedal device 201 or the door 100 has been described in the second and third embodiments, but the present invention is not limited to this configuration and may be applied to various devices.

The configuration in which two protrusions 252 and two stoppers 253 are disposed in the clutch mechanism 214 has been described above in the second and third embodiments, but the present invention is not limited to this configuration and one or three or more protrusions and stoppers may be disposed.

The configuration in which the clutch mechanism 214 is disposed between the planetary gear mechanism (for example, the second planetary gear mechanism 231 or the third planetary gear mechanism 143) closest to the reaction force transmission unit among the plurality of planetary gear mechanisms and the reaction force transmission unit has been described above in the second and third embodiments, but the present invention is not limited to this configuration.

The configuration in which the sun gear is set up on the input side from the motor 211, the carrier is set up on the output side to the reaction force transmission unit, and the ring gear is provided with the clutch mechanism 214 has been described above in the second and third embodiments, but the present invention is not limited to this configuration.

Without departing from the gist of the present invention, the elements in the second and third embodiments may be appropriately replaced with known elements.

Fourth Embodiment

Hereinafter, a fourth embodiment of the present invention will be described with reference to the accompanying drawings.

Figure 26:
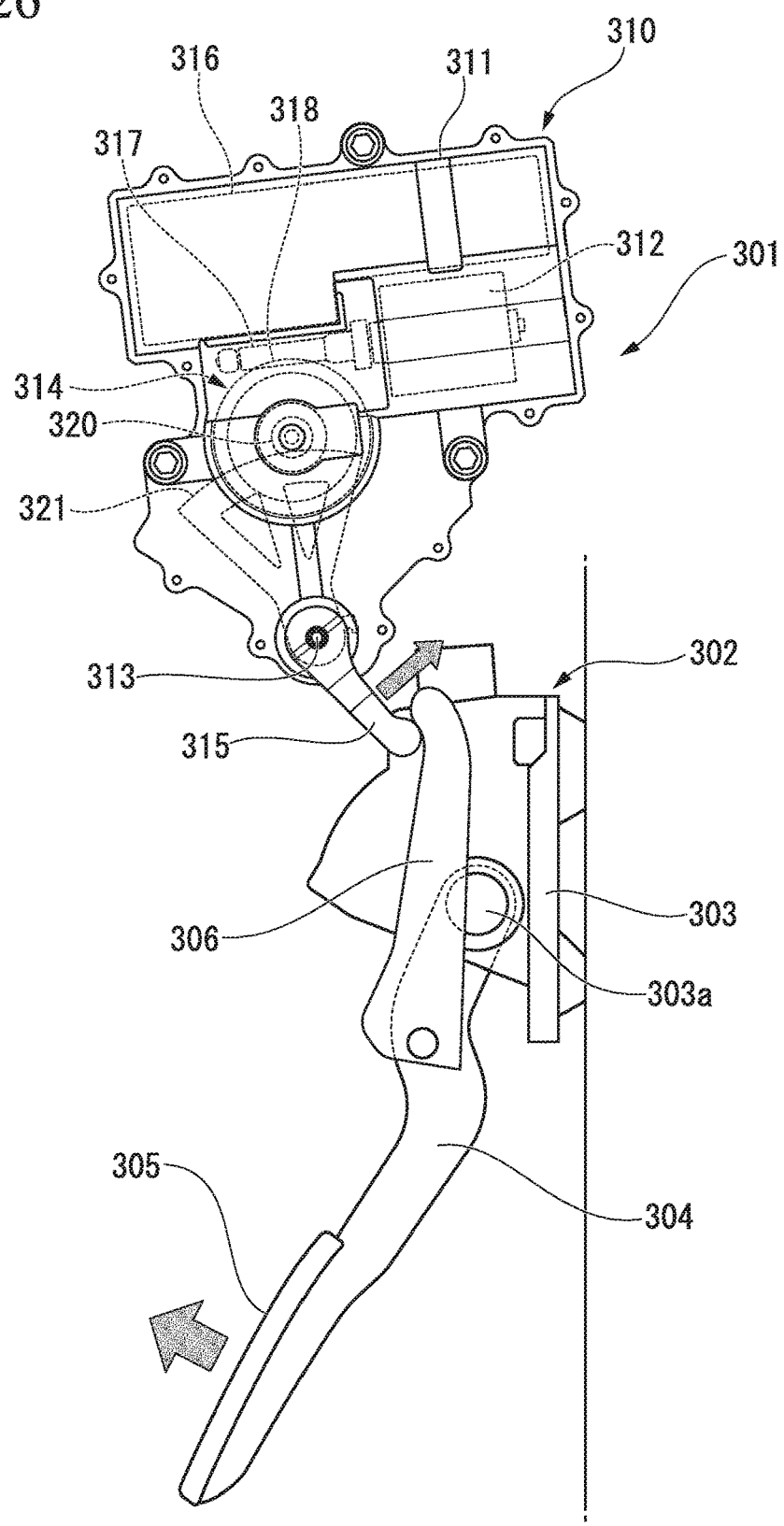
FIG. 26 is a side view illustrating an accelerator pedal device using a reaction force output device according to a fourth embodiment of the present invention

FIG. 26 is a diagram illustrating an accelerator pedal device 301 of a vehicle employing a reaction force output device 310 according to the fourth embodiment.

The accelerator pedal device 301 includes a pedal body unit 302 that is disposed in front of a foot of a driver seat and a reaction force output device 310 that is disposed above the pedal body unit 302 in front of the foot of the driver seat.

The pedal body unit 302 includes a support base 303 that is attached to a vehicle body, a pedal arm 304 (operation pedal, operation unit) of which a base end is rotatably supported by a spindle 303a disposed in the support base 303, and a pedal body 305 (operation pedal, operation unit) that is disposed on the front surface on a tip side of the pedal arm 304 and to which a depressing force is applied by a driver, and the support base 303 is provided with a return spring (not illustrated) that normally biases the pedal arm 304 to an initial position. The pedal arm 304 is connected to a cable (not illustrated) that adjusts a degree of opening of a throttle valve (not illustrated) of an internal combustion engine depending on a degree of operation (rotational angle) of the pedal arm 304. When an electronically controlled throttle is employed in the internal combustion engine, the pedal body unit 302 may be provided with a rotation sensor that detects the rotational angle of the pedal arm 304 and the degree of opening of the throttle valve may be controlled based on a detection signal of the rotation sensor. A reaction force transmission lever 306 (reaction force transmission unit) that extends in a direction substantially opposite to the extending direction of the pedal arm 304 is integrally connected to the vicinity of the base end of the pedal arm 304.

In the fourth embodiment, the pedal arm 304 and the pedal body 305 constitute an operation pedal.

Figure 27:
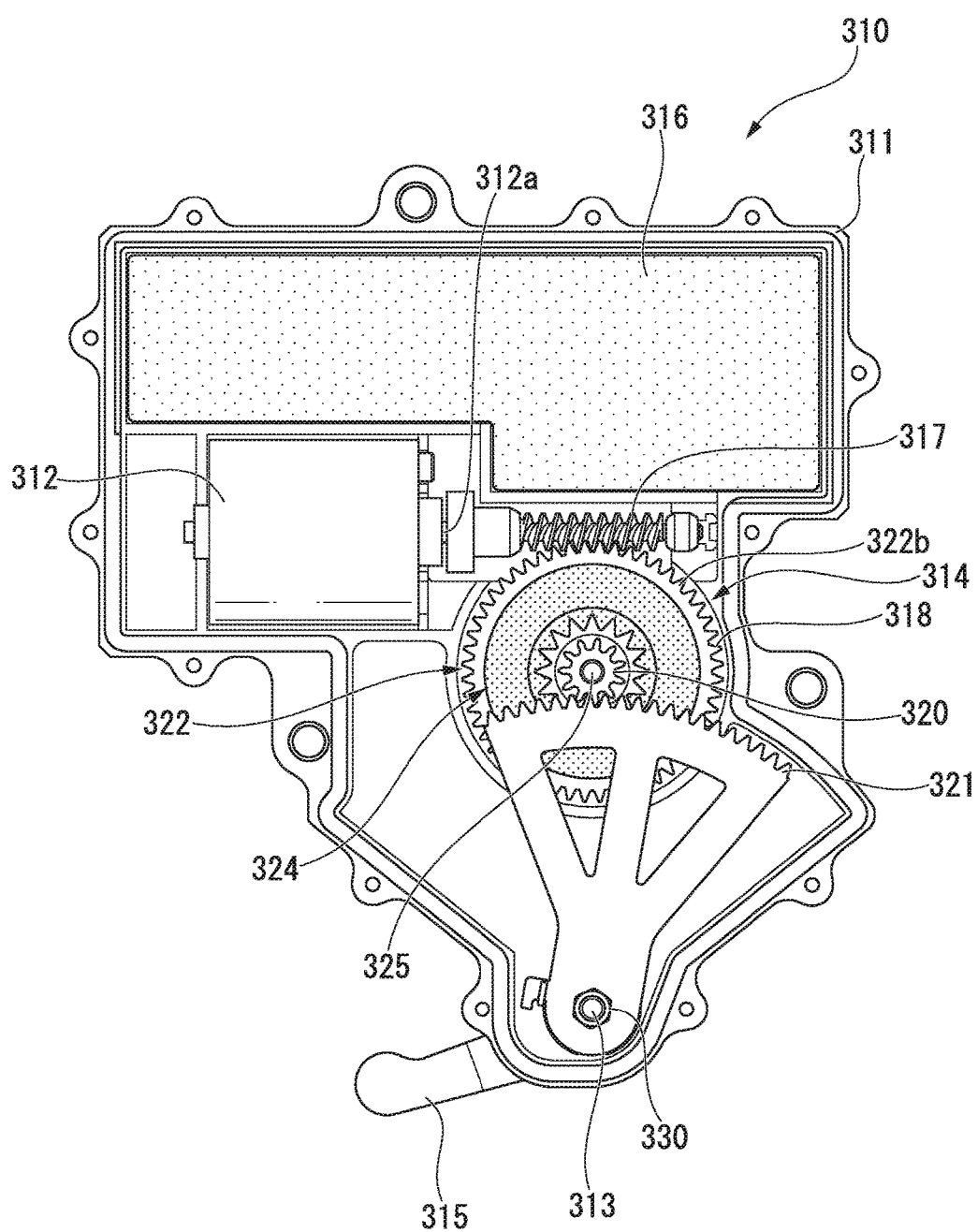
FIG. 27 is a front view illustrating a state in which a housing cover of the reaction force output device according to the fourth embodiment of the present invention is removed.

FIG. 27 is a diagram illustrating an internal structure of the reaction force output device 310. FIG. 27 illustrates a state in which a housing cover of a housing 311 formed of a resin is removed.

The reaction force output device 310 includes a motor 312 as a drive source that creates a reaction force, a reaction force output shaft 313 (reaction force transmission unit) that is rotationally supported by the housing 311, and a reduction mechanism 314 that reduces rotation of the motor 312 to increase a torque and transmits the increased torque to the reaction force output shaft 313. One end in the axial direction of the reaction force output shaft 313 protrudes outward from a side surface of the housing 311 and an output lever 315 (reaction force transmission unit) is integrally connected to the protruding end. As illustrated in FIG. 26, a tip of the output lever 315 can come in contact with the reaction force transmission lever 306 of the pedal body unit 302 in a rotating direction. The output lever 315 and the reaction force transmission lever 306 come in contact with each other when the pedal body 305 is depressed by a driver. Reference numeral 316 in FIG. 27 denotes a circuit board on which a control circuit for driving the motor 312 is mounted.

Figure 28:
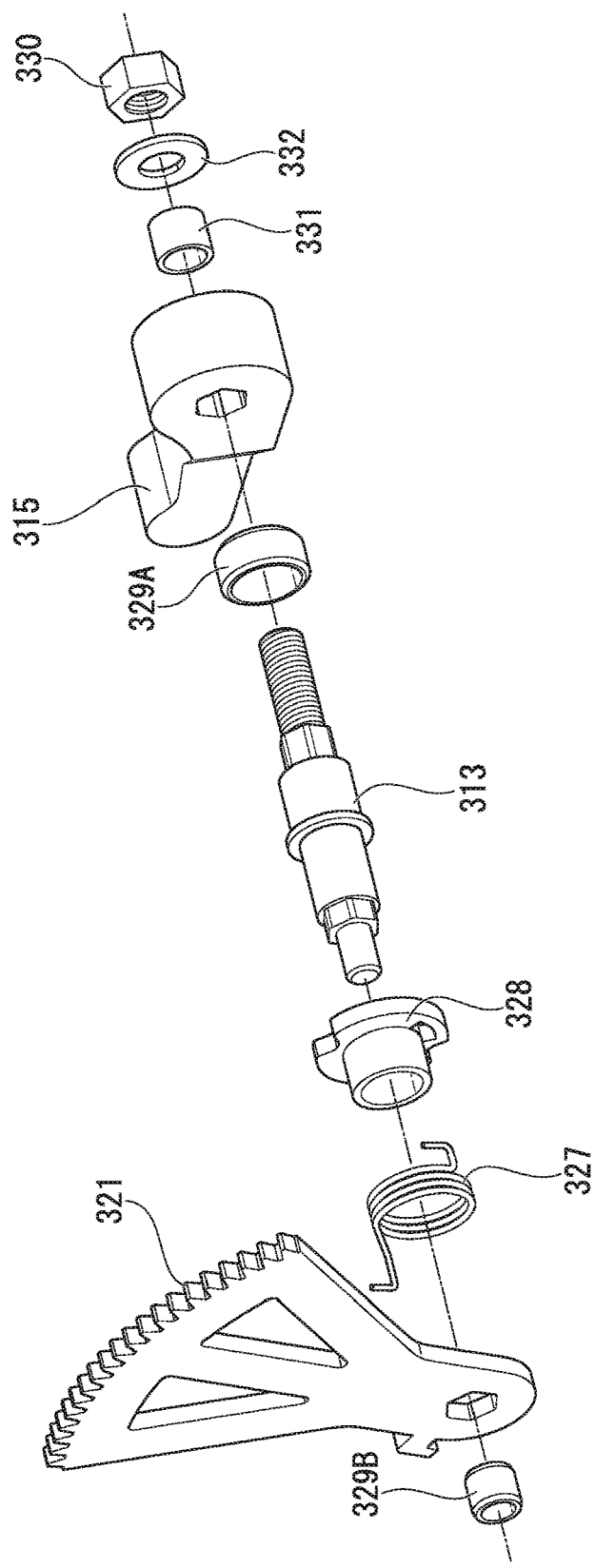
FIG. 28 is an exploded perspective view of members around a reaction force output shaft of the reaction force output device according to the fourth embodiment of the present invention.
Figure 29:
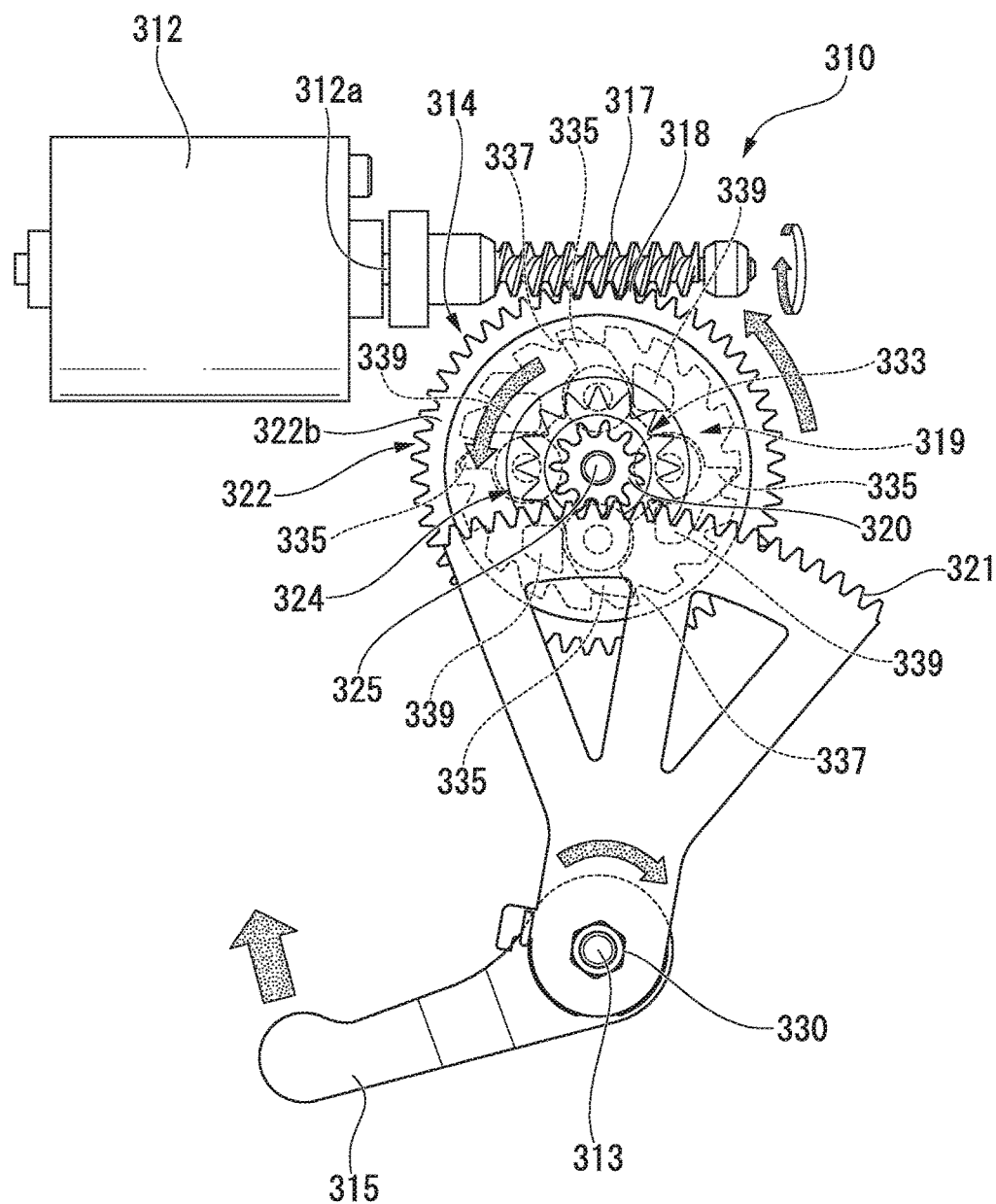
FIG. 29 is a front view illustrating a state in which some components such as a housing of the reaction force output device according to the fourth embodiment of the present invention are removed.

FIG. 28 is an exploded perspective view illustrating members around the reaction force output shaft 313 of the reaction force output device 310 and FIG. 29 is a front view of the reaction force output device 310 in which some components such as the housing 311 are removed therefrom and the internal components are indicated by dotted lines.

As illustrated in FIGS. 27 and 29, the reduction mechanism 314 includes a worm shaft 317 that is coaxially coupled to a rotation shaft 312a of the motor 312, a worm wheel 318 that engages with the worm shaft 317, a pinion gear 320 that is integrally rotatably connected to the worm wheel 318 via a clutch mechanism 319 (see FIG. 29), and a sector gear 321 (reaction force transmission unit) that engages with the pinion gear 320 and the sector gear 321 is integrally coupled to the reaction force output shaft 313. As will be described in detail later, the clutch mechanism 319 connects the worm wheel 318 to the pinion gear 320 when the motor 312 is driven.

In the reduction mechanism 314 according to the fourth embodiment, a first-stage reduction gear is constituted between the worm shaft 317 and the worm wheel 318, and a second-stage reduction gear (final-stage reduction gear) is constituted between the pinion gear 320 and the sector gear 321.

As illustrated in FIGS. 27 and 29, the worm wheel 318 is formed on an outer circumferential surface of a cylindrical wall portion 322b of a first rotary member 322 having a bottomed cylindrical shape. The pinion gear 320 is attached to a second rotary member 324 having a bottomed cylindrical shape and being coaxially and relatively rotatably inserted into the cylindrical wall portion 322b of the first rotary member 322. In the fourth embodiment, the base portion of the pinion gear 320 is coaxially embedded in and fixed to the outer surface of a bottom wall portion of the second rotary member 324. The pinion gear 320 and the second rotary member 324 are supported by the housing 311 via a support pin 325 penetrating and supporting them.

As illustrated in FIG. 28, the sector gear 321 is integrally attached to the other end in the axial direction of the reaction force output shaft 313, and one end of a coil spring 327 (bias spring) rotationally biasing the sector gear 321 and the reaction force output shaft 313 to the initial position is locked to the sector gear 321. The other end of the coil spring 327 is locked to a substantially tubular spring holder 328 locked to the housing 311. Reference signs 329A and 329B in FIG. 28 denote bearings for rotatably supporting the reaction force output shaft 313 on the housing 311, reference numeral 330 denotes a nut for fastening and fixing the output lever 315 to the reaction force output shaft 313, and reference numerals 331 and 332 denote a collar and a washer interposed between the output lever 315 and the nut 330.

Figure 30:
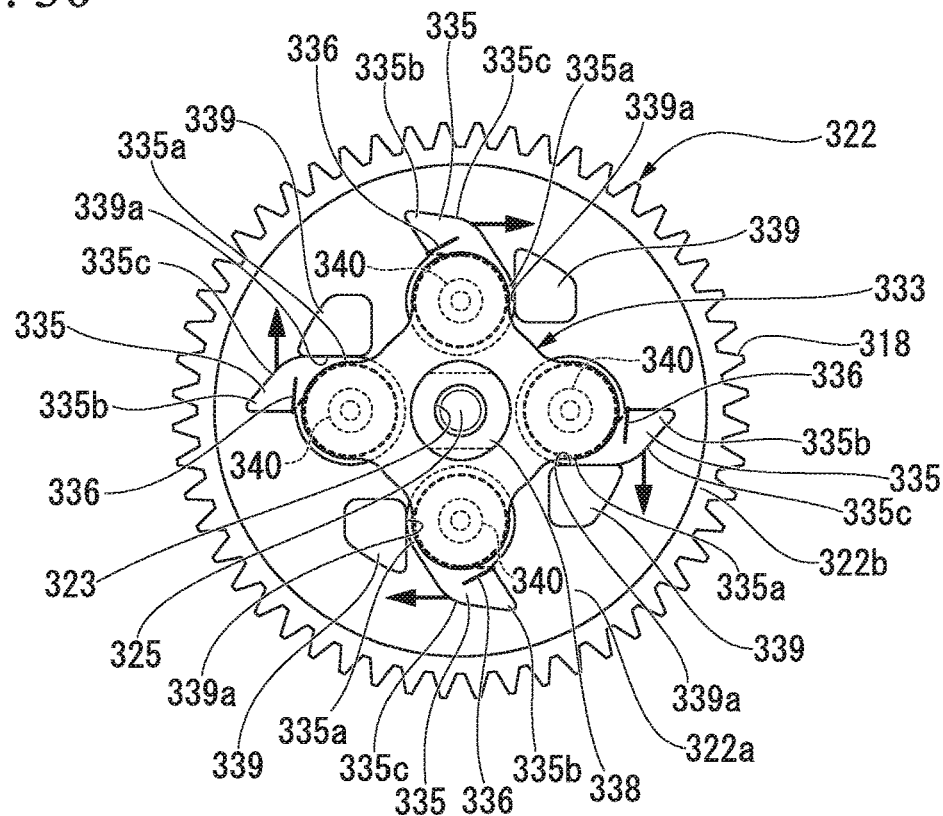
FIG. 30 is a front view of a first rotary member into which a holder block is assembled according to the fourth embodiment of the present invention.
Figure 31:
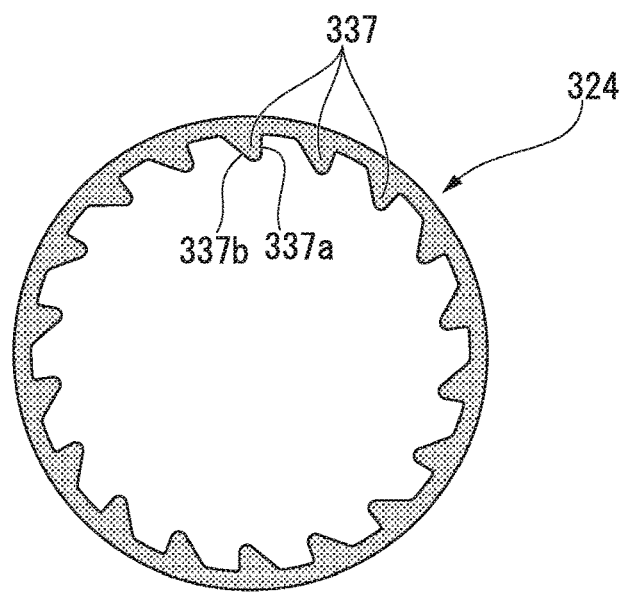
FIG. 31 is a front view illustrating a state in which a bottom wall of a second rotary member is exploded according to the fourth embodiment of the present invention.
Figure 32:
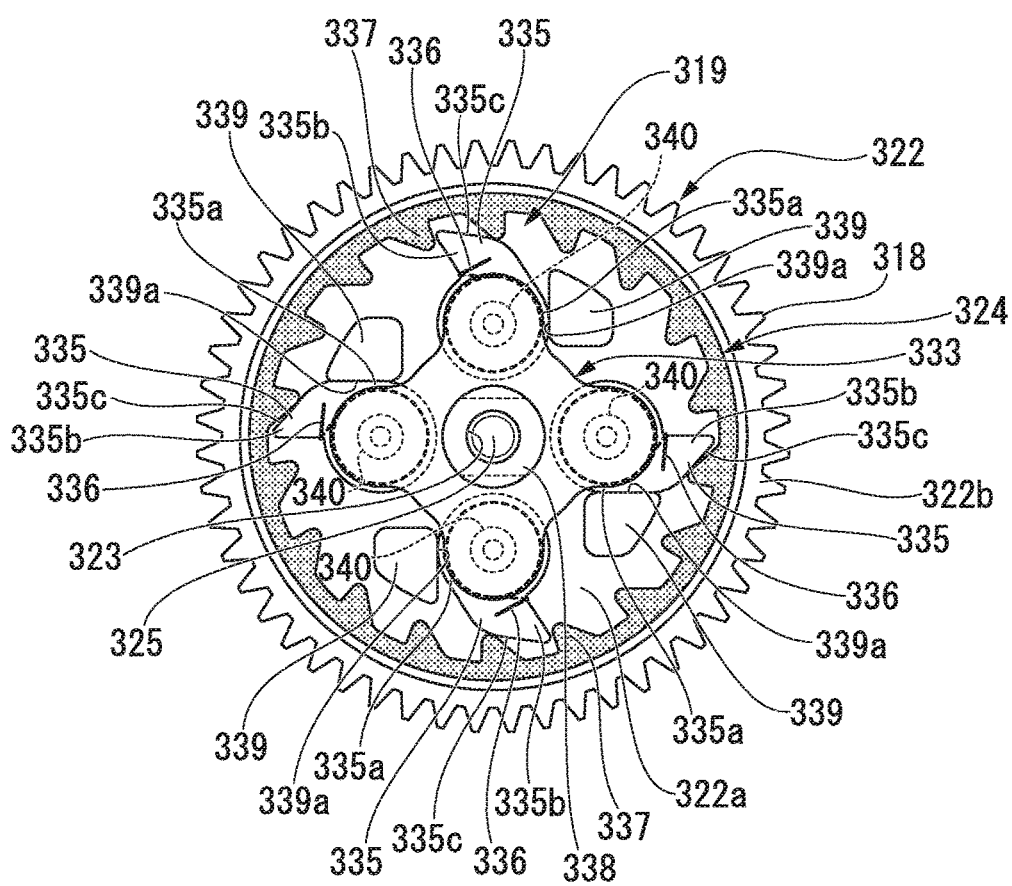
FIG. 32 is a partially exploded front view illustrating a state in which the first rotary member and the second rotary member are assembled according to the fourth embodiment of the present invention.

FIG. 30 is a diagram illustrating an internal structure of the first rotary member 322, FIG. 31 is an exploded view of the bottom wall portion of the second rotary member 324, and FIG. 32 is a diagram illustrating an attachment state of the first rotary member 322 and the second rotary member 324.

As illustrated in FIGS. 29 to 32, the clutch mechanism 319 includes a first rotary member 322 that is connected to the rotation shaft 312a of the motor 312 via the worm shaft 317 (see FIG. 27) and the worm wheel 318, a second rotary member 324 connected to the reaction force output shaft 313 (see FIG. 27) via the pinion gear 320 and the sector gear 321, a holder block 333 that is rotatably disposed on the surface of the bottom wall portion 322a of the first rotary member 322 facing the second rotary member 324, rotates in the same direction as the first rotary member 322 with a rotational force supplied from the first rotary member 322 when the first rotary member 322 rotates due to the motor 312, and has a substantially rectangular shape in a front view, and four clutch claws 335 that are rotatably supported at four corners of the holder block 333. The clutch mechanism 319 includes substantially triangular clutch engagement portions 337 that are arranged at equal intervals in the circumferential direction on the inner circumferential surface of the cylindrical wall portion of the second rotary member 324 and a clutch spring 336 that biases each clutch claw 335 on the holder block 333 to the rotational position at which the clutch claw can engage with the clutch engagement portion 337. In the fourth embodiment, the clutch spring 336 is formed of a twist coil spring.

In the bottom wall portion 322a of the first rotary member 322, a support shaft 338 that rotatably supports the holder block 333 protrudes and four pressing blocks 339 . . . protrude in a concentric shape centered on the support shaft 338 at substantially equal intervals. The support shafts 338 and the pressing blocks 339 . . . protrude from a surface of the bottom wall portion 322a facing the second rotary member 324.

The center of the holder block 333 is rotatably supported by the support shaft 338 and the support shaft 338 protrudes at an axial position of the first rotary member 322. A shaft hole 323 penetrating the first rotary member 322 is formed at the center of the support shaft 338. A support pin 325 that supports the pinion gear 320 and the second rotary member 324 is inserted into the shaft hole 323. The first rotary member 322 is rotatably supported by the housing 311 via the support pin 325. The clutch claws 335 are rotatably supported by spindles 340 disposed at four corners of an outer edge of the holder block 333. The spindles 340 of the holder block 333 are disposed in parallel to the support pin 325 rotatably supporting the first rotary member 322. In each clutch claw 335, a base portion 335a having a substantially circular shape in a front view is rotatably supported by the spindle 340 and a claw piece 335b having a substantially trapezoidal shape protrudes from the base portion 335a.

When it is assumed that a direction (direction indicated by the arrow in FIG. 29) in which the first rotary member 322 rotates at the time of driving of the motor 312 is referred to as a positive rotating direction, each clutch claw 335 is biased outward in the radial direction from the front side in the positive rotating direction of the first rotary member 322 by the clutch spring 336. Each clutch claw 335 is disposed to be rotatable between a clutch engaged position at which the tip of the claw piece 335b faces the outside in the radial direction of the first rotary member 322 with respect to the spindle 340 and a clutch disengaged position at which the tip of the claw piece 335b faces the front side in the positive rotating direction with respect to the spindle 340. The tip of the claw piece 335b is located on a rotary orbit of the clutch engagement portions 337 of the second rotary member 324 when the clutch claw 335 is located at the clutch engaged position, and the tip of the claw piece 335b is located in the rotary orbit of the clutch engagement portions 337 when the clutch claw is located at the clutch disengaged position. As described above, since each clutch claw 335 is biased to the clutch engaged position by the clutch spring 336, the clutch claw can engage with the clutch engagement portion 337 in an initial state.

The tip of the claw piece 335b of each clutch claw 335 is provided with a taper surface 335c connecting a front end face facing the front side in the positive rotating direction of the first rotary member 322 and a rear end face facing the rear side in the positive rotating direction with an inclined surface inclined to the rear side when the clutch claw 335 is located at the clutch engaged position. The taper surface 335c comes in contact with the clutch engagement portion 337 when the clutch claw 335 is located at the clutch engaged position and the clutch engagement portion 337 of the second rotary member 324 rotates in the positive rotating direction prior to the holder block 333. With the load input to the taper surface 335c at this time, the clutch claw 335 is caused to rotate to the front side in the positive rotating direction against the force of the clutch spring 336. Accordingly, the clutch mechanism 319 is switched to the clutch disengaged state.

Four pressing blocks 339 protruding from the bottom wall portion 322a of the first rotary member 322 are disposed on the rear side in the positive rotating direction of the base portions 335a of the clutch claws 335 supported by the holder block 333. A flat pressing surface 339a coming in contact with the base portion 335a of the corresponding clutch claw 335 from the rear side in the positive rotating direction is disposed on the front side in the positive rotating direction of each pressing block 339. The pressing surface 339a regulates the rotation of the clutch claw 335 by coming in contact with the base portion 335a of the corresponding clutch claw 335 from the rear side in the positive rotating direction. Accordingly, in the fourth embodiment, the pressing surface 339a also serves as a rotation regulating portion that regulates the rotation of the clutch claw 335 at the clutch engaged position. The rotation regulating portion may be disposed in the holder block 333.

On the other hand, as illustrated in FIG. 31, each clutch engagement portion 337 of the second rotary member 324 includes an engagement surface 337a that is formed on the rear side in the positive rotating direction to be substantially parallel to the radial direction of the second rotary member 324 and that comes in contact with the front end face of the corresponding clutch claw 335 at the time of clutch engagement and a taper surface 337b that is formed on the front side in the positive rotating direction to be inclined in the radial direction of the second rotary member 324. The taper surface 337b comes in contact with the taper surface 335c of the corresponding clutch claw 335, when the clutch claw 335 is located at the clutch engaged position and the clutch engagement portion 337 of the second rotary member 324 rotates in the positive rotating direction prior to the holder block 333.

A pair of clutch claws 335 and 335 located at diagonal positions on the holder block 333 and the other pair of clutch claws 335 and 335 located at positions displaced 90° therefrom are set to be offset in rotational phase when the clutch claws engage with the clutch engagement portions 337 of the second rotary member 324. Accordingly, when the first rotary member 322 and the second rotary member 324 engage with each other by the clutch, any one of one pair of clutch claws 335 and 335 and the other pair of clutch claws 335 and 335 comes in contact with the clutch engagement portions 337 earlier.

Figure 33:
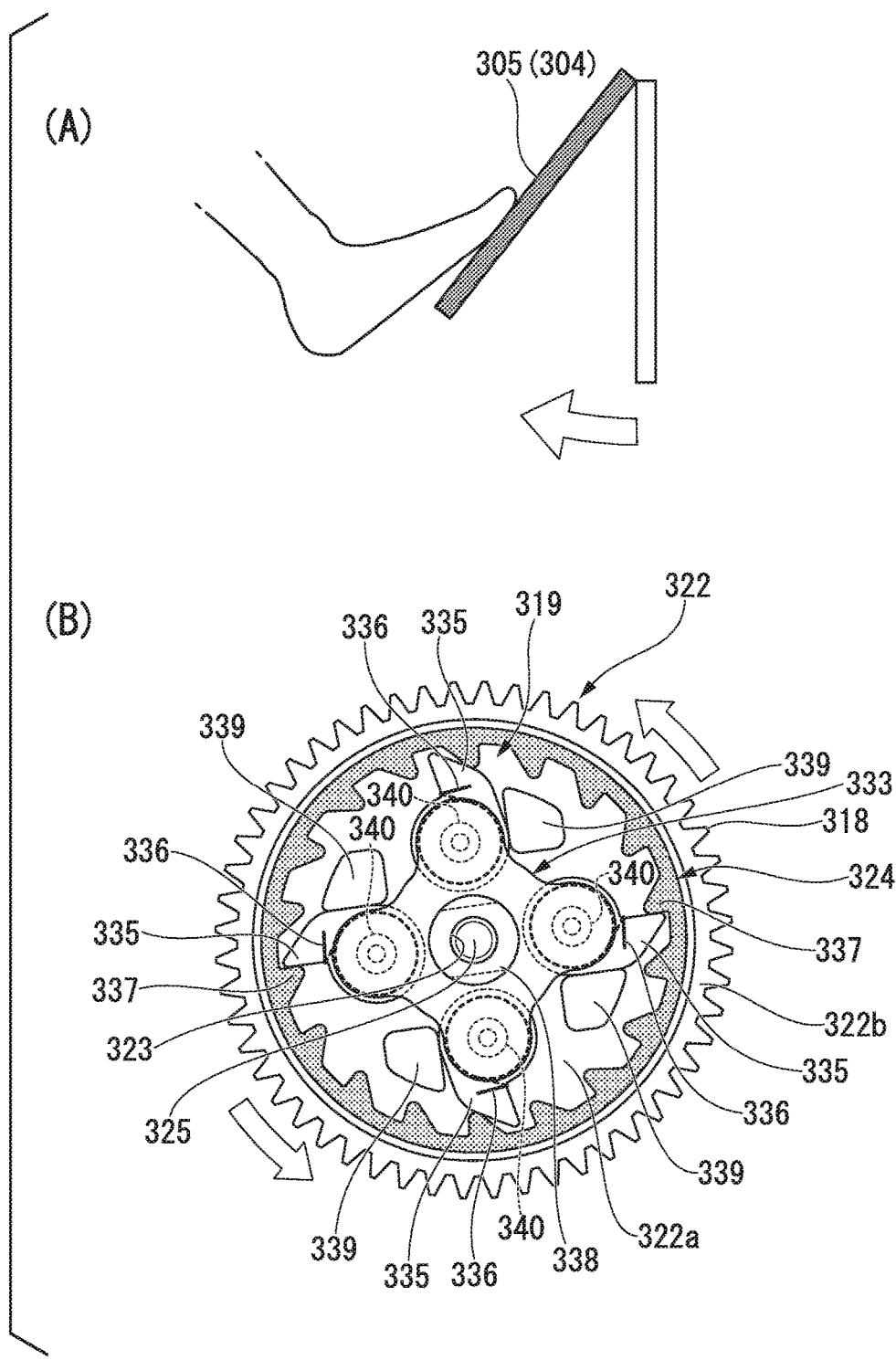
FIG. 33 includes a side view (A) schematically illustrating a state in which an accelerator pedal is depressed according to the fourth embodiment of the present invention and a partially exploded front view (B) illustrating an operation state of a clutch mechanism at that time.
Figure 34:
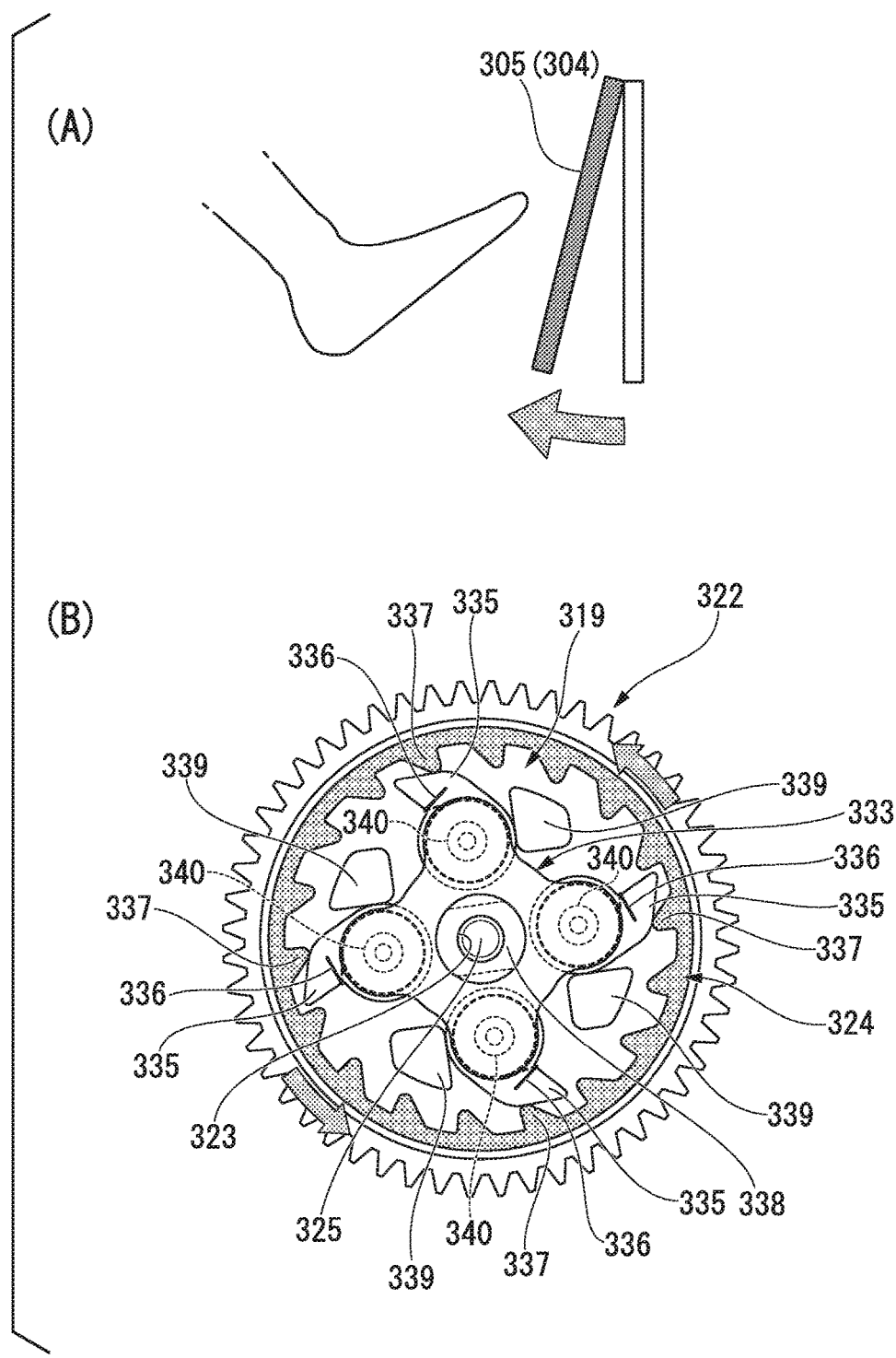
FIG. 34 includes a side view (A) schematically illustrating a state in which the accelerator pedal is depressed and then released according to the fourth embodiment of the present invention and a partially exploded front view (B) illustrating an operation state of a clutch mechanism at that time.

FIG. 33 is a diagram illustrating the operation of the reaction force output device 310 when the operation pedal (the pedal body 305, the pedal arm 304) is depressed and FIG. 34 is a diagram illustrating the operation of the reaction force output device 310 when the operation pedal (the pedal body 305, the pedal arm 304) is rapidly returned. The operation of the reaction force output device 310 will be described below appropriately with reference to the drawings.

When the pedal body 305 illustrated in FIG. 26 is depressed by a driver, the pedal arm 304 rotates in the counterclockwise direction about the spindle 303a and the degree of opening of the throttle valve of the internal combustion engine is adjusted based on the rotational angle. On the other hand, when the pedal arm 304 rotates in the counterclockwise direction from the initial position, the reaction force transmission lever 306 fixed to the pedal arm 304 rotates in the counterclockwise direction along with the pedal arm 304 and the output lever 315 of the reaction force output device 310 in contact with the tip of the reaction force transmission lever 306 rotates in the clockwise direction in FIG. 26 along with the reaction force output shaft 313.

At this time, when the motor 312 of the reaction force output device 310 is driven depending on the depression speed of the pedal body 305 or the driving condition of the vehicle, the driving force of the motor 312 causes the first rotary member 322 to rotate in the positive rotating direction (the direction indicated by an arrow in FIGS. 29 and 33(B)) via the engaged portion of the worm shaft 317 and the worm wheel 318. At this time, each clutch claw 335 of the holder block 333 is located at the clutch engaged position by the biasing force of the clutch spring 336.

In this way, when the first rotary member 322 rotates in the positive rotating direction, the pressing blocks 339 protruding from the first rotary member 322 come in contact with the base portions 335a of the clutch claws 335 on the holder block 333 as illustrated in FIG. 33(B). When the rotation in the positive rotating direction of the first rotary member 322 progresses in this state, the holder block 333 is pressed by the first rotary member 322 and is prone to rotate in the positive rotating direction along with the first rotary member 322. At this time, since each clutch claw 335 is located at the clutch engaged position by the biasing force of the clutch spring 336, one pair of clutch claws 335 and 335 come in contact with certain clutch engagement portions 337 of the second rotary member 324. When the clutch claw 335 comes in contact with the clutch engagement portion 337 in this way, the rear end face on the base end of the claw piece 335b of the clutch claw 335 comes in contact with the pressing block 339 and the rotational position of the clutch claw 335 is maintained at the clutch engaged position. When the first rotary member 322 rotates in the positive rotating direction in this state, the rotational force thereof is transmitted to the second rotary member 324 via the engaged portion of the clutch claw 335 and the clutch engagement portion 337. At this time, the clutch mechanism 319 is switched to the engaged state.

When the clutch mechanism 319 is switched to the engaged state in this way, the pinion gear 320 of the second rotary member 324 rotates in the positive rotating direction to cause the sector gear 321 engaging with the pinion gear 320 to rotate in the clockwise direction in the drawing as illustrated in FIG. 29. As a result, the reaction force output shaft 313 and the output lever 315 integrally coupled to the sector gear 321 rotate in the clockwise direction in the drawing against the biasing force of the coil spring 327 as indicated by an arrow in FIG. 29, and the output lever 315 transmits the reaction force to the pedal arm 304 via the reaction force transmission lever 306 of the pedal body unit 302 as indicated by an arrow in FIG. 26.

At this time, since a torque corresponding to the depression speed of the pedal body 305 or the driving condition of the vehicle is output from the motor 312 to the pedal arm 304, the driver is informed of information such as an acceleration state of the internal combustion engine or "excessive depression" through the sole of her or his foot depressing the pedal body 305.

When the driver's depressing force on the operation pedal (the pedal body 305) is rapidly released as illustrated in FIG. 34(A) in the state in which the operation pedal (the pedal body 305) is depressed, the operation pedal is prone to be returned to the initial position by a force of a return spring (not illustrated) and the output lever 315 of the reaction force output device 310 is prone to follow the return operation of the operation pedal due to the biasing force of the coil spring 327. Accordingly, the second rotary member 324 is prone to rotate in the return direction via the reaction force output shaft 313.

At this time, in the clutch mechanism 319 of the reaction force output device 310, since the second rotary member 324 is prone to rotate in the biasing direction of the coil spring 327 prior to the holder block 333, the clutch claws 335 on the holder block 333 are pressed down in the clutch disengaging direction by the clutch engagement portions 337 of the second rotary member 324. As a result, the clutch mechanism 319 is switched to the disengaged state and the free rotation of the second rotary member 324 in the positive rotating direction is allowed. Accordingly, the output lever 315 rapidly follows the return operation of the operation pedal without being affected by the rotational friction of the motor 312.

As described above, in the reaction force output device 310 according to the fourth embodiment, when the second rotary member 324 rotates in the biasing direction of the coil spring 327 prior to the holder block 333, the clutch claws 335 held by the holder block 333 are pressed down in the clutch disengaging direction by the clutch engagement portions 337. Accordingly, when the operation pedal is rapidly returned, it is possible to rapidly switch the clutch mechanism 319 between the first rotary member 322 and the second rotary member 324 to the disengaged state and it is thus possible to prevent the rotational friction of the motor 312 side from hindering the rotation in the return direction of the output lever 315.

Therefore, in the reaction force output device 310 according to the fourth embodiment, when the operation pedal is rapidly returned, it is possible to cause the output lever 315 to rapidly follow the return operation of the operation pedal. Accordingly, it is possible to cause the reaction force output from the motor 312 to rapidly act on the operation pedal even when the operation pedal is depressed again thereafter.

In the reaction force output device 310 according to the fourth embodiment, a plurality of clutch engagement portions 337 of the second rotary member 324 are disposed at equal intervals in the circumferential direction centered on the rotation axis of the second rotary member 324, a plurality of clutch claws 335 are disposed on the rotary circumference of the first rotary member 322, and the rotational phase when one pair of clutch claws 335 and 335 on the holder block 333 come in contact with the clutch engagement portion 337 and the rotational phase when the other pair of clutch claws 335 and 335 come in contact with the clutch engagement portion 337 are set to be offset from each other. Accordingly, in the reaction force output device 310, when the first rotary member 322 and the second rotary member 324 clutch-engage with each other, one pair closer to the clutch engagement portion 337 among one pair of clutch claws 335 and 335 and the other pair of clutch claws 335 and 335 can engage with the clutch engagement portion 337 earlier. As a result, it is possible to realize rapid clutch engagement.

In the reaction force output device 310 according to the fourth embodiment, the reduction mechanism 314 that increases the torque of the motor 312 is disposed between the rotation shaft 312a of the motor 312 and the reaction force output shaft 313. Accordingly, even when the motor 312 is a small general-purpose motor with a small torque, it is possible to apply a satisfactory reaction force to the pedal arm 304 of the pedal body unit 302. As a result, according to the reaction force output device 310, it is possible to achieve a decrease in size and weight of the reaction force output device 310 by employing a small general-purpose motor.

The present invention is not limited to the above-mentioned embodiments, but can be modified in various forms without departing from the gist thereof. For example, in the fourth embodiment, the holder block 333 is formed separately from the first rotary member 322, but the holder block 333 may be formed integrally with the first rotary member.

In the fourth embodiment, the reaction force output device is used for an accelerator pedal of a vehicle, but the reaction force output device may be applied to an operation pedal of a vehicle other than the accelerator pedal, an operation pedal of a simulation device, or the like.

REFERENCE SIGNS LIST

10 . . . reaction force output device
12 . . . motor
13 . . . reaction force output shaft (reaction force transmission unit)
14 . . . reduction mechanism
15 . . . output lever (reaction force transmission unit)
21 . . . sector gear (reaction force transmission unit)
19 . . . clutch mechanism
22 . . . first rotary member
24 . . . second rotary member
33 . . . holder block
35 . . . clutch pin
36 . . . return spring
37 . . . clutch engagement portion
202 . . . pedal body (operation unit)
210, 112 . . . reaction force output device
211 . . . motor
211a . . . rotation shaft
212, 121 . . . reaction force transmission unit
214 . . . clutch mechanism
231 . . . second planetary gear mechanism (planetary gear mechanism)
232 . . . second sun gear (sun gear, first rotary element)
233 . . . second ring gear (ring gear, third rotary element)
234 . . . second planetary gear (planetary gear)
235 . . . second carrier (carrier, second rotary element)
110 . . . vehicle door (operation unit)
143 . . . third planetary gear mechanism
151 . . . sun gear (first rotary element)
152 . . . ring gear (third rotary element)
153 . . . carrier (second rotary element)
154 . . . planetary gear
304 . . . pedal arm (operation pedal, operation unit)
305 . . . pedal body (operation pedal, operation unit)
310 . . . reaction force output device
312 . . . motor
313 . . . reaction force output shaft (reaction force transmission unit)
315 . . . output lever (reaction force transmission unit)
321 . . . sector gear (reaction force transmission unit)
319 . . . clutch mechanism
322 . . . first rotary member
324 . . . second rotary member
327 . . . coil spring (bias spring)
333 . . . holder block
335 . . . clutch claw
336 . . . clutch spring
337 . . . clutch engagement portion

The invention claimed is:

1. A reaction force output device that outputs a reaction force to an operation unit, comprising:
a motor as a drive source configured to create the reaction force;
a reaction force transmission unit configured to transmit the reaction force to the operation unit; and
a clutch mechanism disposed between the motor and the reaction force transmission unit and configured to set the motor and the reaction force transmission unit to a disengaged state or an engaged state depending on a driving state of the motor;
wherein the clutch mechanism includes:
a first rotary member connected to a rotation shaft side of the motor in a path;
a second rotary member disposed coaxially with the first rotary member to relatively rotate and connected to the reaction force transmission unit side in the path; and
a holder block disposed coaxially with the first rotary member and the second rotary member to relatively rotate between the first rotary member and the second rotary member and configured to hold a clutch pin to move forward and backward, the second rotary member includes a clutch engagement portion configured to come in contact with a tip of the clutch pin protruding from the holder block to transmit power, and the clutch pin is biased in a backward moving direction by a return spring and a base end of the clutch pin comes in contact with the first rotary member to be pressed in a protruding direction when the first rotary member is rotated by the motor.

2. The reaction force output device according to claim 1, wherein a reduction mechanism configured to reduce rotation to increase a torque in the path for transmitting a driving force from a rotation shaft of the motor to the reaction force transmission unit is further disposed between the motor and the reaction force transmission unit.

3. The reaction force output device according to claim 2, wherein the reduction mechanism includes a plurality of stages of reduction gears configured to reduce rotation in a stepwise manner in the path, and the clutch mechanism is disposed closer to the motor than the final-stage reduction gear closest to the reaction force transmission unit in the path.

4. The reaction force output device according to claim 1, wherein a plurality of the clutch engagement portions of the second rotary member are disposed at equal intervals in a circumferential direction centered on a rotation axis of the second rotary member, a plurality of the clutch pins of the holder block are held by the holder block, and a rotational phase of the first rotary member and the second rotary member when one clutch pin on the holder block comes in contact with the clutch engagement portion on the second rotary member side and the rotational phase of the first rotary member and the second rotary member when another clutch pin on the holder block comes in contact with the clutch engagement portion on the second rotary member side are set to be offset from each other.

5. The reaction force output device according to claim 4, wherein the rotational phase of the first rotary member and the second rotary member when one clutch pin on the holder block comes in contact with the clutch engagement portion on the second rotary member side and the rotational phase of the first rotary member and the second rotary member when another clutch pin on the holder block comes in contact with the clutch engagement portion on the second rotary member side are set to be offset from each other by half a pitch angle of the neighboring clutch engagement portions on the second rotary member side.

6. A reaction force output device that outputs a reaction force to an operation unit, comprising:

a motor as a drive source configured to create the reaction force;

a reaction force transmission unit configured to transmit the reaction force to the operation unit;

a clutch mechanism disposed between the motor and the reaction force transmission unit and configured to set the motor and the reaction force transmission unit to a disengaged state or an engaged state depending on a driving state of the motor; and a planetary gear mechanism disposed between the motor and the reaction force transmission unit, wherein the planetary gear mechanism includes a sun gear to which a torque from the motor side is input, a ring gear disposed coaxially with the sun gear, a planetary gear configured to engage with the sun gear and the ring gear, and a carrier configured to support the planetary gear to rotate and revolve and to output the reaction force to the reaction force transmission unit side, the clutch mechanism includes a protrusion configured to protrude from the ring gear, and a stopper configured to come in contact with the protrusion, and the protrusion comes in contact with the stopper to regulate rotation of the ring gear at the time of rotation of the motor and the protrusion is separated from the stopper to allow rotation of the ring gear at the time of stopping of the rotation of the motor.

7. The reaction force output device according to claim 6, wherein a plurality of the planetary gear mechanisms are provided, and the clutch mechanism switches transmission and interception of the reaction force to the reaction force transmission unit side between the planetary gear mechanism located closest to the reaction force transmission unit among the plurality of planetary gear mechanisms and the reaction force transmission unit.

8. A reaction force output device that outputs a reaction force to an operation unit, comprising:

a motor as a drive source configured to create the reaction force;

a reaction force transmission unit configured to transmit the reaction force to the operation unit;

a clutch mechanism disposed between the motor and the reaction force transmission unit and configured to set the motor and the reaction force transmission unit to a disengaged state or an engaged state depending on a driving state of the motor; and a bias spring configured to bias the reaction force transmission unit in a direction following a return operation of the operation unit, wherein the clutch mechanism includes a first rotary member connected to a rotation shaft side of the motor in a path in which a driving force is transmitted from the motor to the reaction force transmission unit, a second rotary member disposed coaxially with the first rotary member to relatively rotate and connected to the reaction force transmission unit side in the path, a holder block configured to rotate in the same direction as the first rotary member with a rotational force received from the first rotary member when the first rotary member is rotated by the motor, a clutch claw held to rotate by the holder block, a clutch engagement portion disposed in the second rotary member to engage with the clutch claw, and a clutch spring configured to bias the clutch claw to a rotational position at which the clutch claw engages with the clutch engagement portion, the clutch claw rotates between a clutch engaged position at which the clutch claw engages with the clutch engagement portion to transmit rotation of the holder block to the second rotary member and a clutch disengaged position at which the clutch claw is disengaged from the clutch engagement portion, and the clutch claw is pressed in a clutch disengaging direction by the clutch engagement portion when the second rotary member rotates in a biasing direction of the bias spring prior to the holder block.

9. The reaction force output device according to claim 8, wherein a plurality of the clutch engagement portions of the second rotary member are disposed at equal intervals in a circumferential direction centered on a rotation axis of the second rotary member,
- a plurality of the clutch claws are disposed on a rotational circumference of the first rotary member, and
- a rotational phase of the first rotary member and the second rotary member when one clutch claw comes in contact with the clutch engagement portion on the second rotary member side and the rotational phase of the first rotary member and the second rotary member when another clutch claw comes in contact with the clutch engagement portion on the second rotary member side are set to be offset from each other.

* * * * *